US012812497B2

(12) United States Patent
Karabulut et al.

(10) Patent No.: US 12,812,497 B2
(45) Date of Patent: Nov. 24, 2026

(54) MEASUREMENT RELAXATION FOR DUAL-CONNECTIVITY

(71) Applicant: Nokia Technologies Oy, Espoo (FI)

(72) Inventors: Umur Karabulut, Munich (DE); Riikka Karoliina Dimnik, Kirkkonummi (FI); Jani-Pekka Kainulainen, Cottenham (GB); Xin Zhang, Taufkirchen (DE)

(73) Assignee: Nokia Technologies Oy, Espoo (FI)

( * ) Notice: Subject to any disclaimer, the term of this patent is extended or adjusted under 35 U.S.C. 154(b) by 273 days.

(21) Appl. No.: 18/796,948

(22) Filed: Aug. 7, 2024

(65) Prior Publication Data

US 2025/0056369 A1 Feb. 13, 2025

(30) Foreign Application Priority Data

Aug. 10, 2023 (FI) ..................................... 20235893

(51) Int. Cl.

*H04W 36/14* (2009.01)
*H04W 36/00* (2009.01)
*H04W 36/36* (2009.01)

(52) U.S. Cl.

CPC ..... *H04W 36/362* (2023.05); *H04W 36/0085* (2018.08); *H04W 36/14* (2013.01)

(58) Field of Classification Search

CPC ....................... H04W 36/362; H04W 36/0085; H04W 36/14

See application file for complete search history.

(56) References Cited

U.S. PATENT DOCUMENTS

2023/0109703 A1* 4/2023 Sun ....................... H04W 24/08 370/329
2023/0217276 A1* 7/2023 Chen ..................... H04W 24/08 370/252

(Continued)

FOREIGN PATENT DOCUMENTS

WO 2022029712 A1 2/2022
WO 2022083947 A1 4/2022

(Continued)

OTHER PUBLICATIONS

"Discussion on CHO including target MCG and candidate SCGs", 3GPP TSG-RAN WG2 Meeting #122, R2-2304690, CATT, Agenda Item: 7.4.4, May 22-26, 2023, pp. 1-5.

(Continued)

*Primary Examiner* — Charles N Appiah
*Assistant Examiner* — Joseph Nghia Dinh
(74) *Attorney, Agent, or Firm* — Barta Jones, PLLC

(57) ABSTRACT

According to an aspect, there is provided an apparatus configured to perform the following. The apparatus performs radio measurements of one or more primary cells, PCells, and of primary secondary cells, PSCells, associated with the one or more PCells. Then, the apparatus evaluates a conditional handover, CHO, execution condition of the one or more PCells and a conditional PSCell addition/change, CPAC, execution condition of the PSCells based on the radio measurements. At least in response to the CPAC execution condition for a first PSCell being satisfied while the CHO execution condition for any PCell associated with the first PSCell is not satisfied, the apparatus relaxes or stops radio measurements of at least one PSCell.

20 Claims, 15 Drawing Sheets

(56) References Cited

U.S. PATENT DOCUMENTS

| | | | | |
|---|---|---|---|---|
| 2023/0262554 | A1* | 8/2023 | Leng ................. | H04W 36/0069 455/437 |
| 2024/0334265 | A1* | 10/2024 | Ganeshan ........... | H04W 36/362 |
| 2024/0365203 | A1* | 10/2024 | Liu ..................... | H04W 36/362 |

FOREIGN PATENT DOCUMENTS

| | | | |
|---|---|---|---|
| WO | 2022191600 | A1 | 9/2022 |
| WO | 2022240334 | A1 | 11/2022 |
| WO | 2023006377 | A1 | 2/2023 |
| WO | 2023131172 | A1 | 7/2023 |

OTHER PUBLICATIONS

"Discussion on UE reporting for RLM BFD relaxation", 3GPP TSG-RAN WG2 Meeting #118, R2-2204888, NEC, Agenda Item: 6.9.3.2, May 9-20, 2022, 7 pages.
"3rd Generation Partnership Project; Technical Specification Group Radio Access Network; NR; Requirements for support of radio resource management (Release 18)", 3GPP TS 38.133, V18.1.0, Mar. 2023, 5925 pages.
Office action received for corresponding Finnish Patent Application No. 20235893, dated Mar. 13, 2024, 16 pages.

* cited by examiner

MEASUREMENT RELAXATION FOR DUAL-CONNECTIVITY

TECHNICAL FIELD

Various example embodiments relate to wireless communications.

BACKGROUND

In dual connectivity such as multi radio access technology (RAT) dual-connectivity (MR-DC), a given terminal device may be served by two different random access network (RAN) nodes: a Master (RAN) Node (MN) and a Secondary (RAN) node. The MN is associated with a primary cell group (PCG) comprising a primary cell (PCell) and optionally one or more secondary cells (SCells) while the SN is associated with a secondary cell group (SCG) comprising one or more primary secondary cells (PSCells) and optionally one or more secondary cells (SCells). Two different mechanisms for conditional re-configuration exist in MR-DC: conditional handover (CHO) for conditional reconfiguration primary cells (PCells) and conditional primary secondary cell addition/change (CPAC) for conditional reconfiguration of PSCells. In order to carry out handover for both the PCell and the PSCell, execution conditions for both CHO and CPAC need to be satisfied by a terminal device. In some cases, CPAC execution condition may become satisfied while CHO execution conditions is not satisfied. In such a case, according to current practice, the terminal device, nevertheless, continues evaluation of both CHO and CPAC execution conditions until also the CHO execution condition is met.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
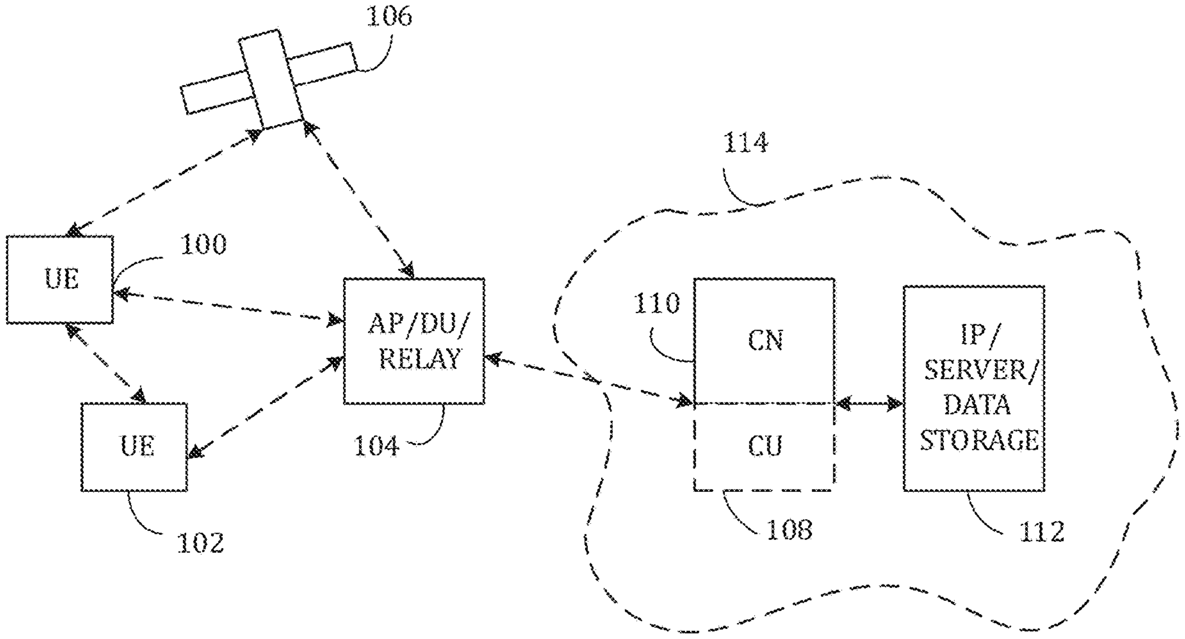
FIG. 1 illustrates a system to which some embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. The user equipment may comprise a mobile equipment and at least one universal integrated circuit card (UICC).

The user device typically refers to a portable computing device that includes wireless mobile communication devices operating with or without a subscriber identification module (SIM) or UICC, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements con-trolling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into the RAN by utilizing network function virtualization (NVF) and software defined networking (SDN). Using edge cloud may mean access node operations to be carried out, at least partly, in a server, host or node operationally coupled to a remote radio head or unit (RU) or base station comprising radio parts. It is also possible that node operations will be distributed among a plurality of servers, nodes or hosts. Application of cloud-RAN architecture enables RAN real time functions being carried out at the RAN side (in a distributed unit, DU 104) and non-real time functions being carried out in a centralized manner (in a central or centralized unit, CU 108). Thus, in summary, the RAN may comprise at least one distributed access node comprising a central unit, one or more distributed units communicatively connected to the central unit and one or more (remote) radio heads or units, each of which is communicatively connected to at least one of the one or more distributed units.

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future rail-way/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

6G architecture is targeted to enable easy integration of everything, such as a network of networks, joint communication and sensing, non-terrestrial networks and terrestrial communication. 6G systems are envisioned to encompass machine learning algorithms as well as local and distributed computing capabilities, where virtualized network functions can be distributed over core and edge computing resources. Far edge computing, where computing resources are pushed to the very edge of the network, will be part of the distributed computing environment, for example in "zero-delay" scenarios. 5G systems may also employ such capabilities. More generally, the actual (radio) communication system is envisaged to be comprised of one or more computer programs executed within a programmable infrastructure, such as general-purpose computing entities (servers, processors, and like).

Embodiments to be discussed below relate specifically to multi radio access technology (RAT) dual connectivity (MR-DC). Thus, while FIG. 1 illustrates for simplicity only a single access node 104, the communications systems associated with embodiments may comprise a plurality of access nodes. Namely, a given MR-DC capable terminal device 100, 102 may be served by (i.e., communicatively connected to) two different types of random access network (RAN) nodes: a Master (RAN) Node (MN) providing the control plane connection to the core network 110 and a Secondary (RAN) node (SN) providing additional resources for the terminal device 100, 102. The MN may be, e.g., a master ng-eNB. The SN may be, e.g., secondary ng-eNB. The MN is associated with a primary cell group (PCG) comprising a primary cell (PCell) and optionally one or more secondary cells (SCells) while the SN is associated with a secondary cell group (SCG) comprising a primary secondary cells (PSCell) being the primary cell under the SCG and optionally one or more secondary cells (SCells).

Two different mechanisms for conditional re-configuration in MR-DC exist: conditional handover (CHO) for conditional reconfiguration primary cells (PCells) and conditional primary secondary cell addition/change (CPAC) for conditional reconfiguration of PSCells. For carrying CHO+CPAC handover, a terminal device may be configured with a plurality of CHO+CPAC configurations. Each CHO-CPAC configuration may define a unique combination of a PCell and a PSCell. To perform CHO-CAPC handover, CHO and CPAC execution conditions are evaluated in parallel based on radio measurements of the PCells and PSCells of the CHO+CPAC configuration. In order to carry out handover for both the PCell and the PSCell, both (execution) conditions of CHO and CPAC need to be satisfied by a terminal device. In some cases, it may occur that the CPAC execution condition becomes satisfied while the CHO execution condition is still not satisfied. In such a case, the terminal device continues evaluation of both CHO and CPAC executions conditions until also the CHO execution condition is met. In other words, even though the CHO execution condition for a PCell is met, the terminal device will still continue the measurements of other PSCells as well as evaluation of the CPAC execution condition of those other PSCells. Thus, the terminal device performs unnecessary measurements and CAPC execution condition evaluation which leads to throughput loss in case of inter-frequency measurements as well as excessive power consumption due to measurements and terminal device processing on CPAC execution condition evaluation (intra-frequency and inter-frequency).

Figure 2:
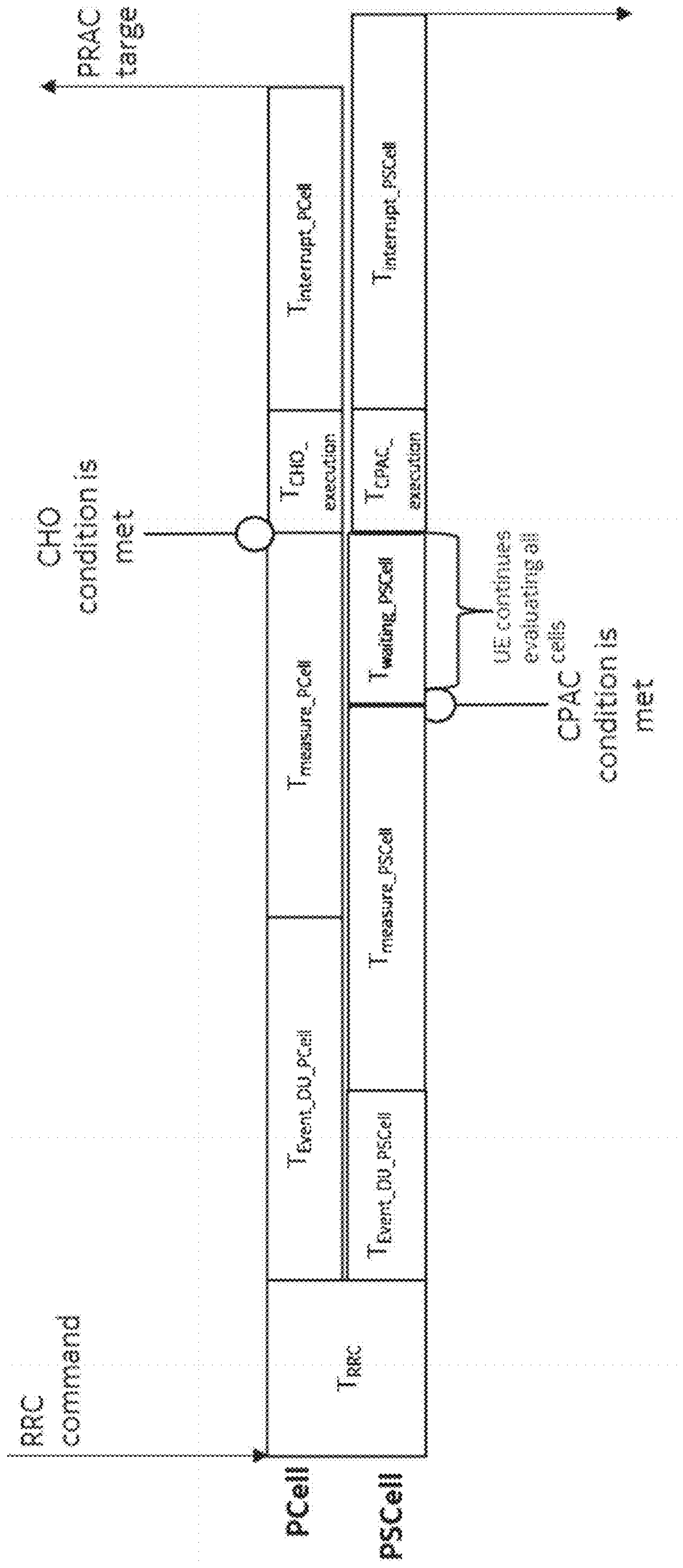
FIG. 2 illustrates scheduling in CHO+CPAC handover scenario without any CPAC measurement relaxation mechanism.

FIG. 2 shows RAN4 delay requirements of a terminal device for CHO+CPAC scenario further illustrating the problem discussed above. The upper part of FIG. 2 shows terminal device radio measurements ($T_{measure\_PCell}$) and subsequent evaluation of the CHO of PCell-1 over time following a reception of a radio resource control (RRC) command while the lower part of FIG. 2 shows the terminal device radio measurements ($T_{measure\_PSCell}$) and subsequent evaluation of the CPAC of PSCell-1 over time following the reception of the RRC command. When the CPAC execution condition is met, the terminal device will continue the measurements of all other PCells and PScells during the time $T_{waiting\_PSCell}$ and executes the CHO+CPAC configuration (over time slots $T_{CHO\_execution}$, $T_{interrupt\_PCell}$, $T_{CPAC\_execution}$ & $T_{interrupt\_PSCell}$) only once the CHO condition is also met. Following the completion of the CHO+CPAC handover, the terminal device initiates communication over physical random access channel (PRACH).

In FIG. 2, $T_{Event\_DU\_PCell}$ may be defined as the delay uncertainty which is the time from when the UE successfully decodes a conditional handover command with conditional PSCell addition/change until a condition exists at the measurement reference point which will trigger the conditional handover. Moreover, $T_{Event\_DU\_PSCell}$ may be defined as the delay uncertainty which is the time from when the UE successfully decodes a conditional handover command with conditional PSCell addition/change until a condition exists at the measurement reference point which will trigger the conditional PSCell addition/change.

The embodiments to be discussed below serve to overcome or to at least alleviate the problems described in the two previous paragraphs by providing mechanisms for either stopping or at least relaxing CPAC-related measurements when the CPAC execution conditions have been satisfied.

Figure 3:
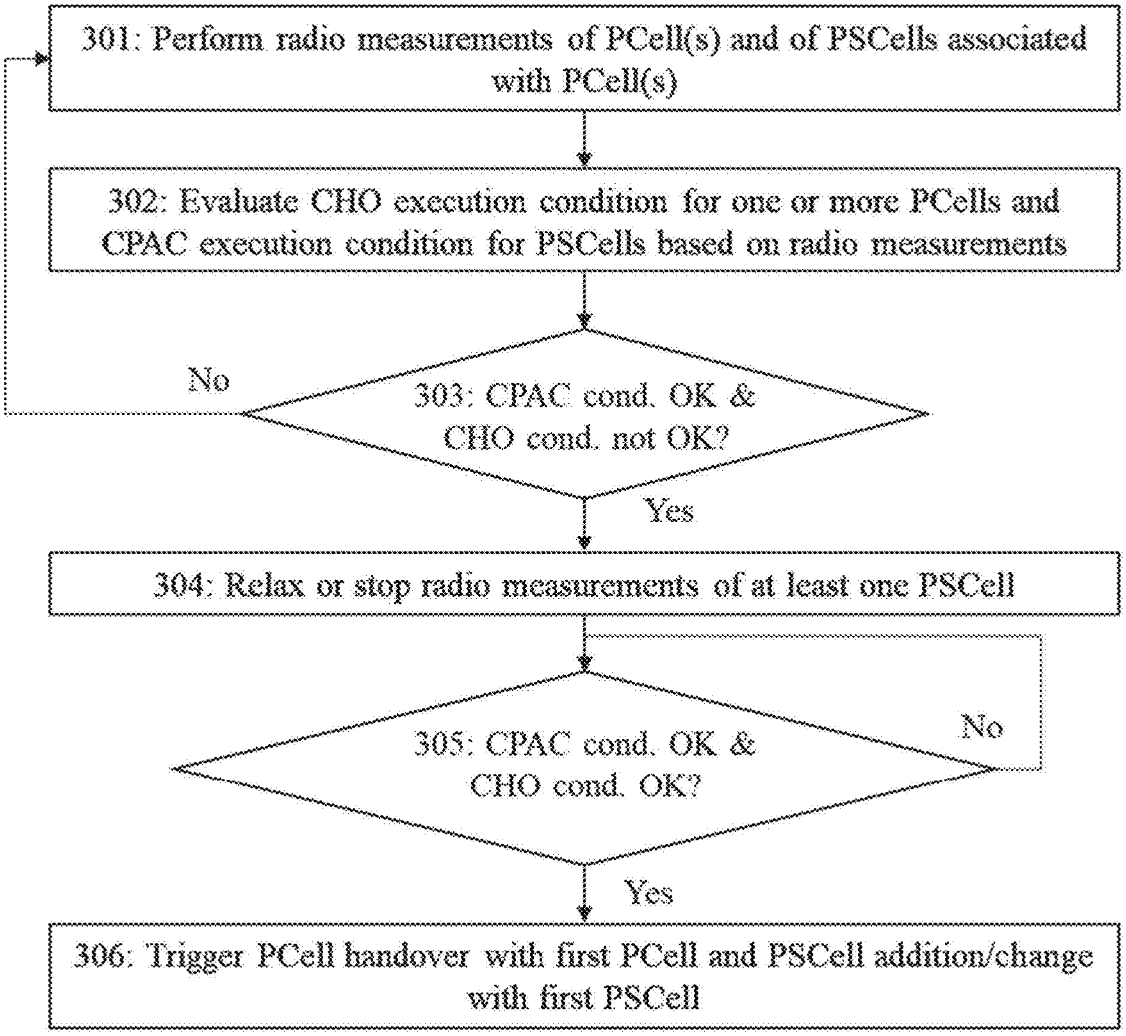
FIGS. 3, 4A, 5A, 6A and 7 illustrate processes according to embodiments.

FIG. 3 illustrates a process according to embodiments for performing a CHO+CPAC handover. The illustrated processes of FIG. 3 may be performed by a terminal device or a part thereof. The terminal device may be one of the terminal devices 100, 102 of FIG. 1. In the following, the entity performing the process of FIG. 3 is called an apparatus for simplicity.

Referring to FIG. 3, the apparatus initially performs, in block 301, radio measurements of one or more PCells and of PSCells associated with the one or more PCells. The one or more PCells may be served by one or more (target) MNs while the PSCells may be served by (target) SNs. The performing of the radio measurements in block 301 may comprise performing measurements on reference signals associated with the one or more PCells and transmitted by the one or more MNs and on reference signals associated with the PSCells and transmitted by the SNs. The radio measurements for each of the one or more PCells and/or PSCells may be performed periodically or regularly.

The one or more PCells for which radio measurements are performed in block 301 may be associated with one or more frequencies, that is, the one or more PCells may operate using the same frequency or using at least partly different frequencies. Similarly, the PSCells for which radio measurements are performed in block 301 may be associated with one or more frequencies, that is, the PSCells may operate using the radio frequency or using at least partly different frequencies. In general, each PCell and each PSCell may be associated with a measurement object (measObj) defining properties of the measurements (e.g., a frequency, a bandwidth, cell identity and physical cell identity). The measurement objects for the PSCell may be determined by a source MN of the terminal device with regard to the CPAC execution condition and the prepared PSCells. The measurement object(s) for the one or more PCells may also be determined by the source MN of the terminal device.

The apparatus evaluates, in block 302, a CHO execution condition for one or more PCells and a CPAC execution condition for the PSCells based on the radio measurements. The evaluating may be carried out continuously or periodically or regularly during the performing of the radio measurements. The CHO execution condition may be determined by a source MN of the terminal device. The CPAC execution condition may be determined by the one or more (target) MNs. The MN may indicate the execution condition(s) to the UE, e.g., in one or more configuration messages.

The CHO execution condition and/or the CPAC execution condition may correspond, e.g., to any of the measurement report triggering events A1 to A6 as defined in technical specifications of 3GPP. For example, the execution condition may correspond to an entry condition of any of the measurement report triggering events A1 to A6. In addition to the entry condition, a leave condition for the CHO execution and/or the CPAC execution may also be defined. For example, in the case of an A3 event, the entry condition may be defined as "Target cell is n dB or more stronger than the serving cell" while the leave condition may be defined as "Target cell is m dB or less stronger than the serving cell", where n and m are positive real numbers with $n>m$ (e.g., $n=3$ & $m=2$). With this definition, the hysteresis behavior is ensured, i.e., once the entry condition is satisfied, a small impairment in the measurements does not lead the time-to-trigger (TTT) timer to be terminated.

In response to the CPAC execution condition for a first PSCell being satisfied while the CHO execution condition for any PCell associated with the first PSCell is not satisfied in block 303, the apparatus relaxes or stops, in block 304, radio measurements of at least one PSCell. The radio measurements of the at least one PSCell may be relaxed or stopped at any frequency or at least at frequencies not used by the first PSCell.

In some alternative embodiments where radio measurements of multiple PCells are performed in block 301, in response to the CPAC execution condition for a first PSCell being satisfied while the CHO execution condition for any PCell associated with the first PSCell is not satisfied in block 303, the apparatus may relax or stop, in block 304, radio measurements of at least one PCell, instead of or in addition to the at least one PSCell. Said at least one PCell may be PCell(s) not associated with the first PSCell. The radio measurements of the at least one PCell may be relaxed or stopped at any frequency or at least at frequencies not used by the first PCell.

In response to the CPAC execution condition for any first PSCell not being satisfied in block 303, the apparatus continues the performing of the radio measurements (block 301) and the evaluation of the CHO & CPAC execution condition (block 302).

It should be noted that, in some embodiments, one or more further criteria (in addition to the criterion of block 303) may need to be satisfied before the apparatus moves on to block 304, as will be described in connection with further embodiments (see, e.g., FIGS. 5A, 5B, 6A & 6B).

Here and in the following, the relaxing of radio measurements may be defined to mean relaxing (i.e., making less strict) requirements associated with said radio measurements. For example, the relaxed measurement requirements may be for intra-frequency, NR inter-frequency or inter-RAT frequency cells selected by the PSCell & CPAC conditions. For example, the relaxing may comprise increasing periodicity of the radio measurements, that is, performing the radio measurements less often. In contrast, stopping of the radio measurements means that no radio measurements are performed at all (at least at certain frequencies). The relaxation/stopping may not only be limited to the RRC IDLE state operation but can also be applied to RRC INACTIVE and/or CONNECTED states.

In some embodiments, the relaxing/stopping of the radio measurements may correspond to stopping performing of layer-3 (L3) measurements, i.e., stop frequent measurements of a PSCell, stop sampling them with layer-1 (L1) filter and L3 filter. However, the terminal device may still perform the physical layer (PHY) measurements to see if the PSCell is or has been detected.

In some embodiments, the at least one PSCell for which radio measurements are relaxed or stopped in block 304 comprises all of the PSCells other than the first PSCell. In some embodiments, the at least one PSCell for which radio measurements are relaxed or stopped in block 304 may consist only of all of the PSCells other than the first PSCell. That is, radio measurements of all other PSCells are relaxed but the radio measurements for the first PSCell are not relaxed or stopped.

In some embodiments, the at least one PSCell for which radio measurements are relaxed or stopped in block 304 comprises at least one PSCell other than the first PSCell. In some embodiments, the at least one PSCell for which radio measurements are relaxed or stopped in block 304 may consist only of at least one PSCell other than the first PSCell. That is, at least the radio measurements for the first PSCell are not relaxed or stopped.

In some embodiments, the at least one PSCell for which radio measurements are relaxed or stopped in block 304 comprises the first PSCell. This may, in some embodiments, additionally include relaxing or stopping other PSCell(s) than the first PSCell.

In response to the CPAC execution condition for the first PSCell and the CHO execution condition of a first PCell associated with the first PSCell being satisfied in block 305, the apparatus triggers, in block 306, a PCell handover with the first PCell and a PSCell addition/change with the first PSCell. In practice, the apparatus may execute a CHO+ CPAC configuration associated with the first PCell and the first PSCell stored in a memory of the apparatus. This may comprise carrying out a first random access procedure with the target MN associated with the first PCell and optionally a second random access procedure with the target SN associated with the first PSCell. The radio measurements of block 301 and the evaluation of block 302 may also be stopped in block 306.

In response to the CPAC execution condition for the first PSCell and the CHO execution condition of any PCell associated with the first PSCell still not being satisfied in block 305, the apparatus continues the performing of the radio measurements (with some of the radio measurements relaxed or stopped) and the evaluation of the CHO & CPAC execution condition.

In some embodiments, blocks 305, 306 may be omitted.

In some embodiments, the apparatus may receive, before block 301, a message from a master node. The message may be, for example, a reconfiguration message or more specifically an RRC reconfiguration message. The message comprises at least one or more measurement relaxation/stopping configurations for the apparatus. Each of the one or more measurement relaxation/stopping configurations may define one or more pre-defined rules for stopping or relaxing radio measurements of at least one PSCell (and/or at least one PCell). The apparatus may perform the relaxing or stopping of the radio measurements of the at least one PSCell (and/or the at least one PCell) in block 304 based on one of the one or more measurement relaxation/stopping configurations. The message may also comprise one or more CHO+CPAC configurations for the terminal device. The one or more CHO+CPAC configurations may be used for carrying out any of blocks 301, 302, 303, 305, 306. The configuration of the apparatus is discussed in further detail in connection with FIG. 13.

Figure 4A:
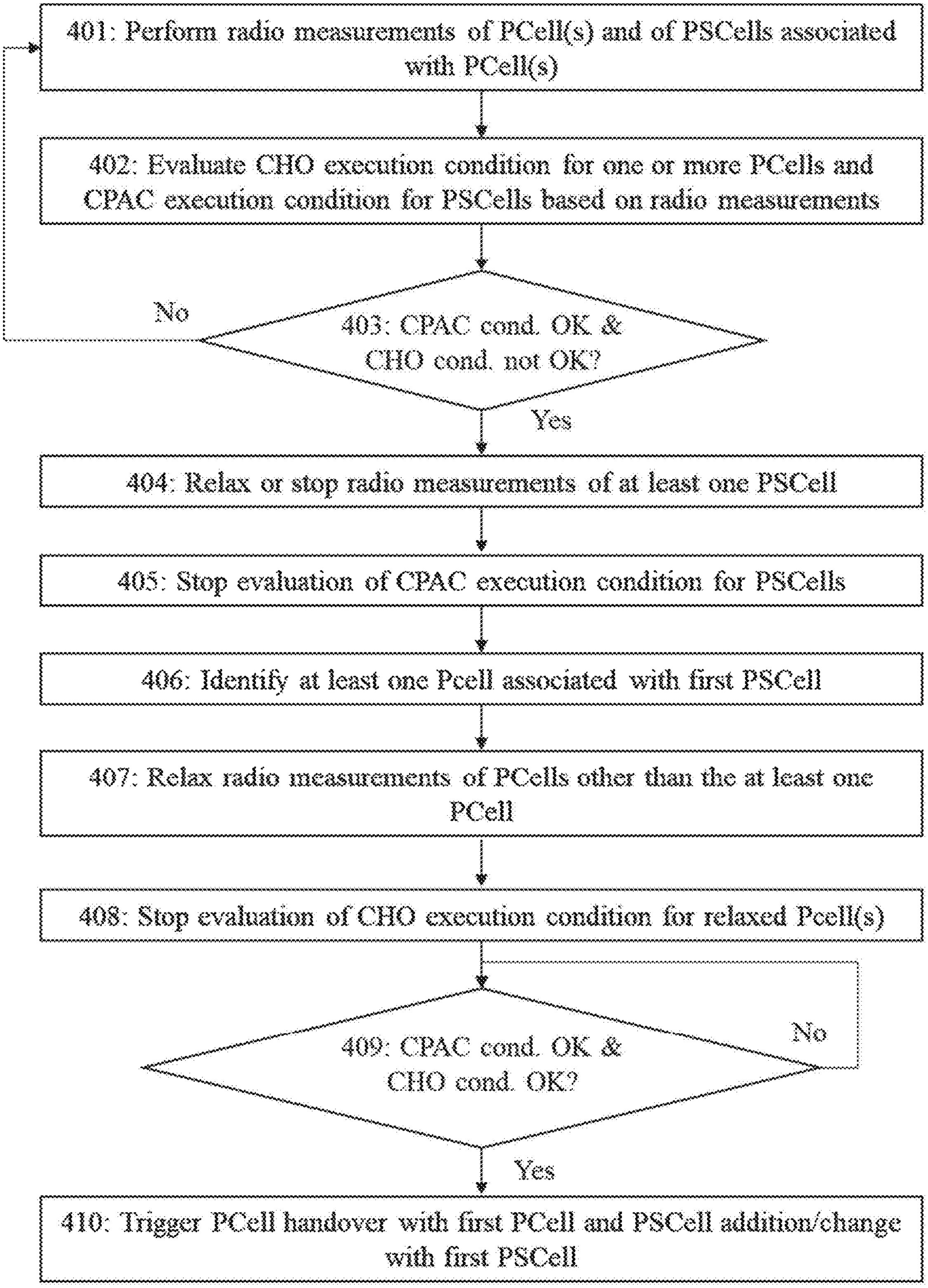

FIG. 4A illustrates another process according to embodiments for performing a CHO+CPAC handover. The illustrated processes of FIG. 4A may be performed by a terminal device or a part thereof. The terminal device may be one of the terminal devices 100, 102 of FIG. 1. In the following, the entity performing the process of FIG. 4A is called an apparatus for simplicity.

The initial steps 401 to 404 of the process of FIG. 4A may correspond fully to steps 301 to 304 of the process of FIG. 3 and are, thus, not repeated here for brevity.

In FIG. 4A, in response to the CPAC execution condition for a first PSCell being satisfied while the CHO execution condition for any PCell associated with the first PSCell is not satisfied in block 403, the apparatus not only relaxes or stops, in block 404, radio measurements of at least one PSCell (similar to FIG. 3) but also stops, in block 405, evaluation of the CPAC execution condition for the PSCells (or at least some of them such as the at least one PSCell whose radio measurements were relaxed or stopped).

In some embodiments, the apparatus may stop, in block 405, the evaluating of the CPAC execution condition for the PSCells while still maintaining any detected PSCells. In other words, the apparatus may stop performing layer-3 (L3) measurements, i.e., stop frequent measurements of a PSCell, stop sampling them with layer-1 (L1) filter and L3 filter. However, the terminal device may still perform the physical layer (PHY) measurements to see if the PSCell is or has been detected. Here, the PSCell detection may be relaxed, that is, the apparatus may still be able to detect PSCells but the associated cell detection period (parameter Tdetect) may be increased.

Moreover, in the process of FIG. 4A, the apparatus may also choose to relax radio measurements of some of the PCells in response to the CPAC execution condition for a first PSCell being satisfied while the CHO execution condition for any PCell associated with the first PSCell is not satisfied in block 403. Namely, the apparatus identifies, in block 406, at least one PCell associated with the first PSCell (or all PCell(s) associated with the first PSCell). Then, the apparatus relaxes (or stops), in block 407, radio measurements of all PCells other than the at least one PCell associated with the first PSCell. The relaxing in block 407 may concern all frequencies or at least any frequencies not used by the at least one PCell. or radio measurements of all PCells other than the at least one PCell associated with the first PSCell at frequencies not used by the at least one PCell.

The apparatus also stops, in block 408, the evaluation of the CHO execution condition for any PCell for which radio measurements were relaxed in block 407. In some embodiments, the apparatus may stop, in block 408, the evaluation of the CHO execution condition while still maintaining the detected PCell(s). In other words, the apparatus may stop performing layer-3 (L3) measurements, i.e., stop frequent measurements of a PCell, stop sampling them with layer-1 (L1) filter and L3 filter. However, the terminal device may still perform the physical layer (PHY) measurements to see if the PCell is detected.

The remaining actions of FIG. 4A relating to blocks 409, 410 correspond fully to actions described above in connection with blocks 305, 306 and are, thus, not repeated here for brevity.

In some embodiments, one, two or three of block 405, blocks 406-408 or block 408 of FIG. 4A may be omitted. In other words, functionalities described in connection with any of block 405, blocks 406-407 and block 408 may be considered optional.

Figure 4B:
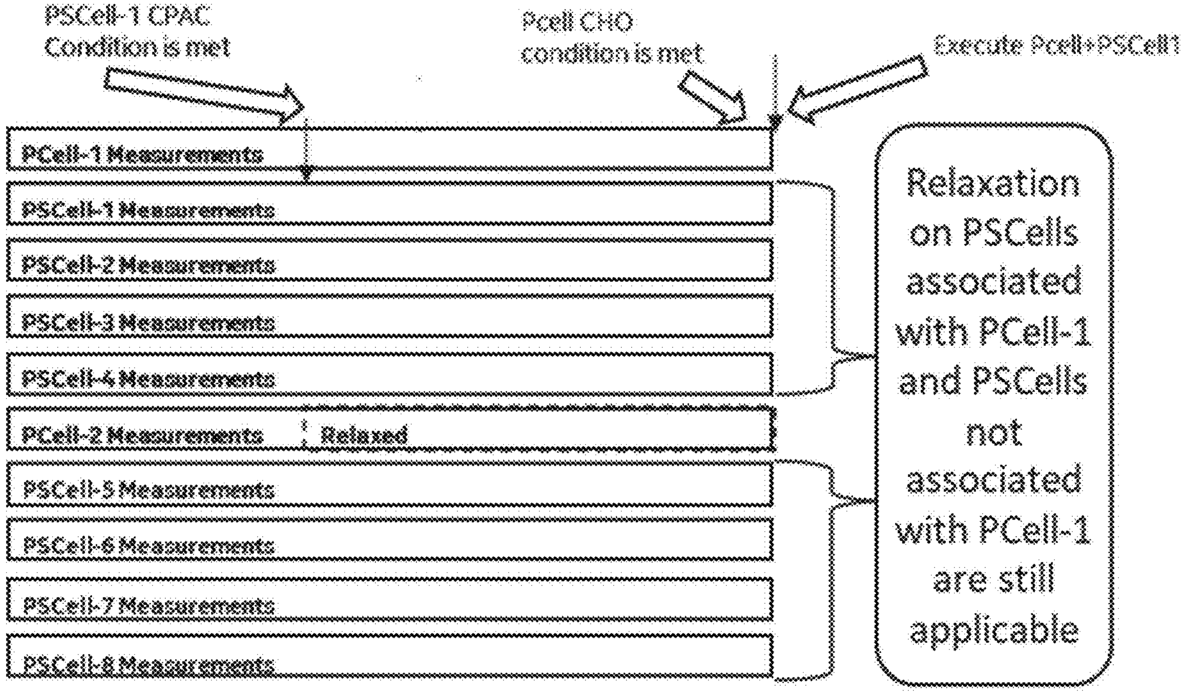
FIGS. 4B, 5B, 6B and 8 to 12 illustrates examples of applying CPAC and/or CHO measurement relaxation mechanisms according to different embodiments.

FIG. 4B illustrates an example of carrying out the process of FIG. 4A. FIG. 4B relate specifically to an exemplary case where radio measurements are performed initially for two PCells (PCell-1 & PCell-2) and eight different PSCells (PSCell-1 to PSCell-8). In FIGS. 4B, the vertical bars show the radio measurements per prepared cells (for both PCells and PScells) as a function of time from left to right. When a vertical bar terminates, this means that the apparatus (e.g., a terminal device) performs measurement stopping/relaxation for the associated PCell or PSCell. In FIG. 4B, it is assumed that initially radio measurements are being performed for all of the PCell-1 & PCell-2 and the PSCell-1 to PSCell-8. In the example of FIG. 4B, once it is determined that PSCell-1 associated with PCell-1 satisfies the CPAC execution condition, radio measurements of the PCell-2 are relaxed or stopped. Evaluation of the CHO condition for PCell-2 may also be stopped in this case (not shown in FIG. 4B). Additionally, radio measurements of one or more of the PSCell-1 to PSCell-8 may be relaxed or stopped here according to processes described in connection with different embodiments. In other words, the PSCell measurements relaxation/stopping schemes according to different embodiments may be combined with the PCell relaxation/stopping scheme of FIG. 4B. Evaluation of CPAC conditions may optionally also be stopped for some of PSCell-1 to PSCell-8 (not shown in FIG. 4B).

Figure 5A:
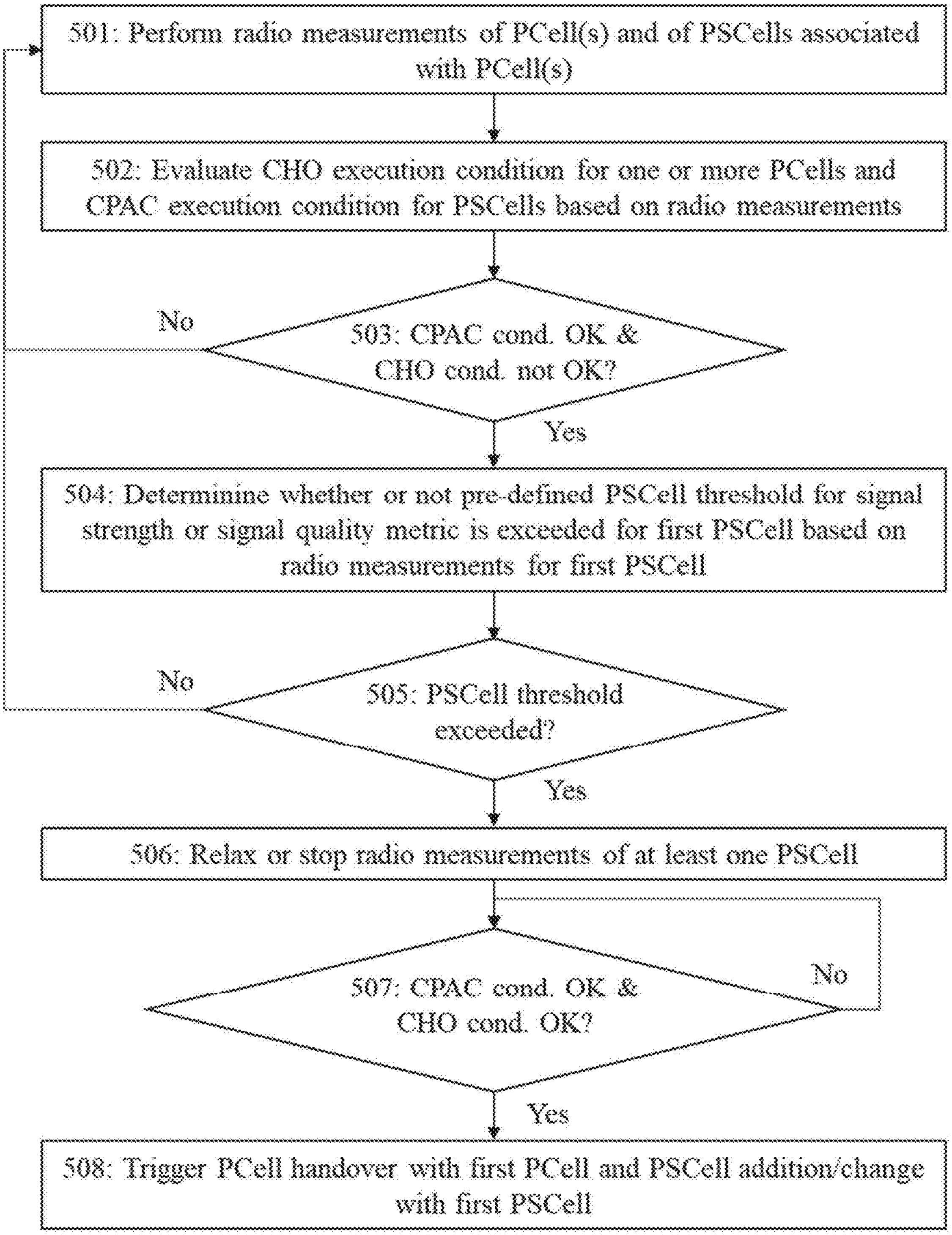

FIG. 5A illustrates another process according to embodiments for performing a CHO+CPAC handover. The illustrated processes of FIG. 5A may be performed by a terminal device or a part thereof. The terminal device may be one of the terminal devices 100, 102 of FIG. 1. In the following, the entity performing the process of FIG. 5A is called an apparatus for simplicity.

The process of FIG. 5A corresponds to a large extent to the process of FIG. 3. Namely, blocks 501 to 503, 506 to 508 of FIG. 5 may correspond fully to blocks 301 to 303, 304 to 306 of FIG. 3. Thus, actions pertaining to blocks 501 to 503, 506 to 508 are not discussed in the following for brevity.

Compared to the process of FIG. 3, FIG. 5A introduces a secondary criterion for triggering the relaxing/stopping of radio measurements of at least one PSCells. Similar to FIG. 3, the apparatus checks, in block 503, whether or not the CPAC execution condition for a first PSCell is satisfied while the CHO execution condition for any PCell associated with the first PSCell is not satisfied in block 303. If this is true, the apparatus determines, in block 504, whether or not a pre-defined PSCell threshold for a signal strength or signal quality metric is exceeded for the first PSCell based on the radio measurements for the first PSCell. The signal strength or signal quality metric may be, for example, reference signal receiver power (RSRP) or reference signal received quality (RSRQ). To perform the determination in block 504, the apparatus may wait until a certain number of new radio measurements for the first PSCell are available and base the determination at least on said new radio measurements. Only if the pre-defined PSCell threshold is exceeded in block 505, the apparatus proceeds to perform, in block 506, the relaxation or stopping of the radio measurements of at least one PSCell. As mentioned above, the relaxation or stopping may be performed as discussed already above (e.g., in connection with block 304 of FIG. 3).

In response to either of the conditions defined in block 503 or block 505 being not satisfied, the apparatus continues the performing of the radio measurements (block 501) and the evaluation of the CHO & CPAC execution condition (block 502).

In some embodiments, the features discussed in connection with blocks 504, 505 may be combined with the process of FIG. 4A (and/or any other processes according to embodiments to be discussed below).

Figure 5B:
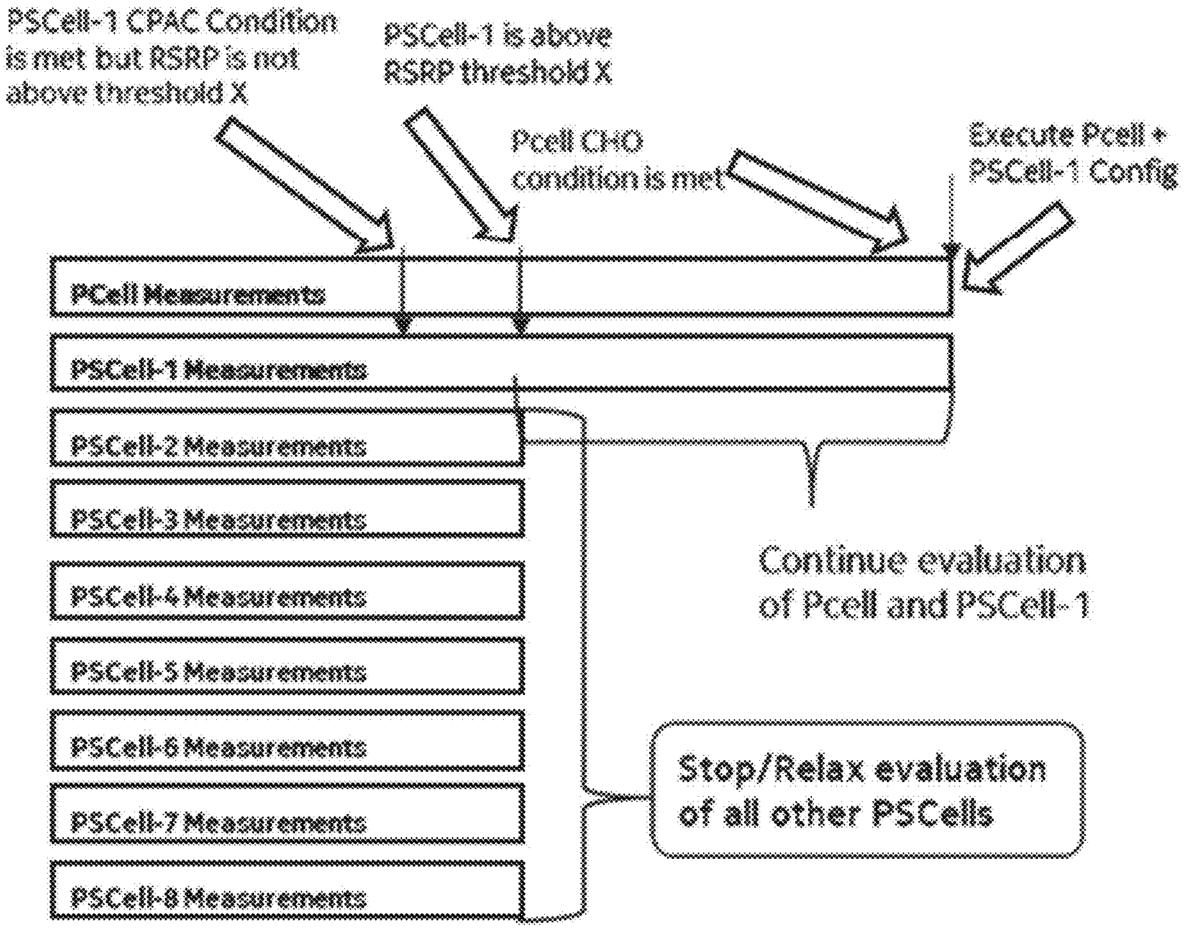

FIG. 5B illustrates an example of carrying out the process of FIG. 5A. FIG. 5B relates specifically to an exemplary case where radio measurements are performed initially for a single PCell and eight different PSCells. In FIG. 5B, the vertical bars show the radio measurements per prepared cells (for both PCell and PScells) as a function of time from left to right. When a vertical bar terminates, this means that the apparatus (e.g., a terminal device) performs measurement stopping/relaxation for the associated PCell or PSCell. In FIG. 5B, it is assumed that initially radio measurements are being performed for all of the PCell and the PSCell-1 to PSCell-8. In the example of FIG. 5B, once it is determined that PSCell-1 satisfies the CPAC execution condition and subsequently that radio measurements of the PSCell-1 exceed the pre-defined threshold, radio measurements of the PSCell-2 to PSCell-8 are relaxed or stopped.

Figure 6A:
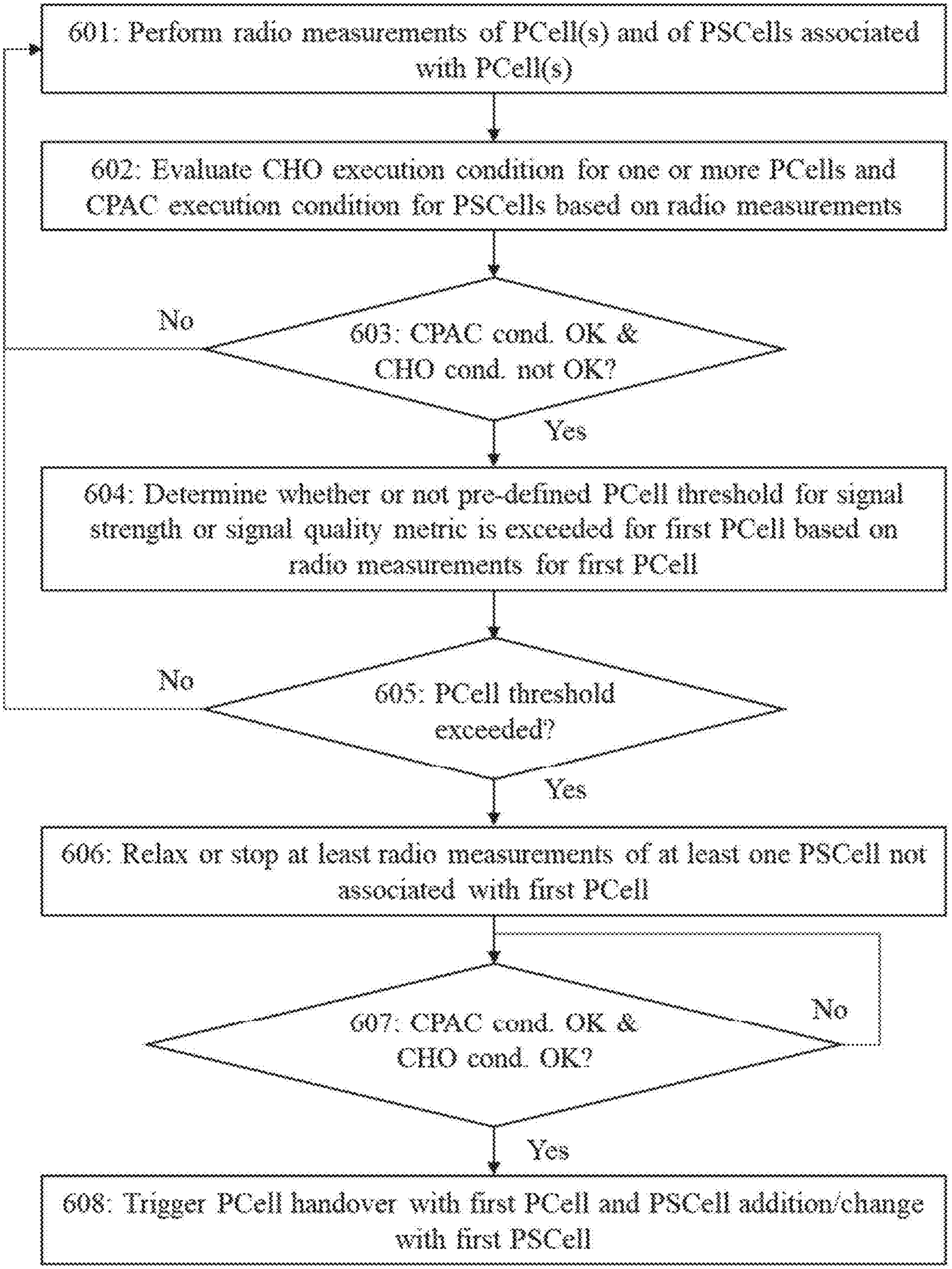

FIG. 6A illustrates another process according to embodiments for performing a CHO+CPAC handover. The illustrated processes of FIG. 6A may be performed by a terminal device or a part thereof. The terminal device may be one of the terminal devices 100, 102 of FIG. 1. In the following, the entity performing the process of FIG. 6A is called an apparatus for simplicity.

The process of FIG. 6A corresponds to a large extent to the process of FIG. 3. Namely, blocks 601 to 603, 607 to 608 of FIG. 5 may correspond fully to blocks 301 to 303, 305 to 306 of FIG. 3. Thus, actions pertaining to blocks 601 to 603, 607 to 508 are not discussed in the following for brevity.

Compared to the process of FIG. 3, FIG. 6A introduces a secondary criterion for triggering the relaxing/stopping of radio measurements of at least one PSCells, somewhat similar to FIG. 5A. However, while, in the case of FIG. 5A, the secondary condition related to the signal strength/quality associated with the first PSCell satisfying the CPAC execution condition, here the secondary condition relates to the signal strength/quality associated with a first PCell associated with the first PSCell. Thus, similar to FIG. 3, the apparatus checks, in block 503, whether or not the CPAC execution condition for a first PSCell is satisfied while the CHO execution condition for any PCell associated with the first PSCell is not satisfied. If this is true, the apparatus determines, in block 604, whether or not a pre-defined PCell threshold for a signal strength or signal quality metric is exceeded for first PCell associated with the first PSCell based on the radio measurements for the first PCell. The signal strength or signal quality metric may be, for example, reference signal receiver power (RSRP) or reference signal received quality (RSRQ). To perform the determination in block 604, the apparatus may wait until a certain number of new radio measurements for the first PCell are available and base the determination at least on said new radio measurements. Only if the pre-defined PCell threshold is exceeded in block 605, the apparatus proceeds to perform, in block 606, the relaxation or stopping of the radio measurements of at least one PSCell. Here, the relaxation or stopping of radio measurements in block 606 may specifically target at least any PSCells which are not associated with the first PCell (i.e., which are associated with another PCell).

In response to either of the conditions defined in block 603 or block 605 being not satisfied, the apparatus continues the performing of the radio measurements (block 601) and the evaluation of the CHO & CPAC execution condition (block 602).

In some embodiments, the features discussed in connection with blocks 604, 605 may be combined with the process of FIG. 4A and/or FIG. 5A (and/or any other processes according to embodiments to be discussed below).

Figure 6B:
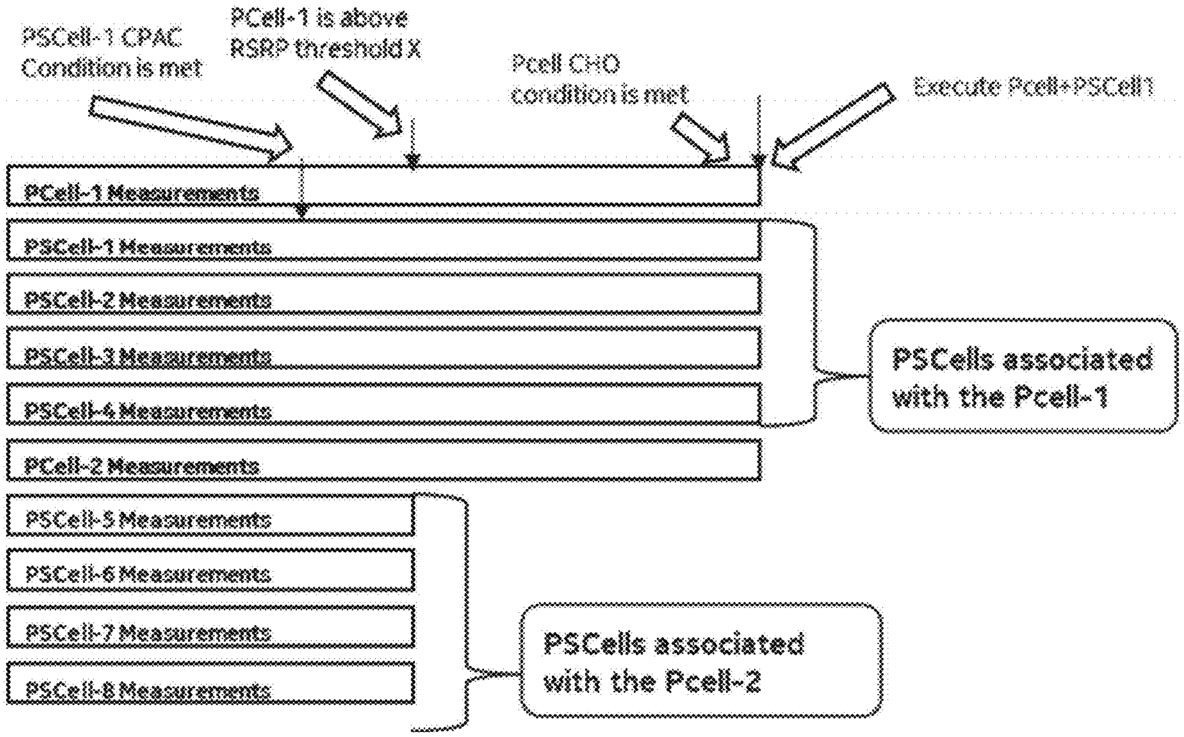

FIG. 6B illustrates an example of carrying out the process of FIG. 6A. FIG. 6B relates specifically to an exemplary case where radio measurements are performed initially for two PCells (PCell-1 & PCell-2) and eight different PSCells (PSCell-1 to PSCell-1). PSCell-1 to PSCell-4 are associated with PCell-1 while PSCell-5 to PSCell-8 are associated with PCell-2. In FIG. 6B, the vertical bars show the radio measurements per prepared cells (for both PCells and PScells) as a function of time from left to right. When a vertical bar terminates, this means that the apparatus (e.g., a terminal device) performs measurement stopping/relaxation for the associated PCell or PSCell. In FIG. 6B, it is assumed that initially radio measurements are being performed for all of PCell-2 & PCell-2 and PSCell-1 to PSCell-8. In the example of FIG. 6B, once it is determined that PSCell-1 satisfies the CPAC execution condition and subsequently that radio measurements of the PCell-1 exceed the pre-defined PCell threshold (being here specifically a threshold for RSRP), radio measurements of PSCell-5 to PSCell-8 associated with PCell-2 (i.e., not PCell-1) are relaxed or stopped.

Figure 7:
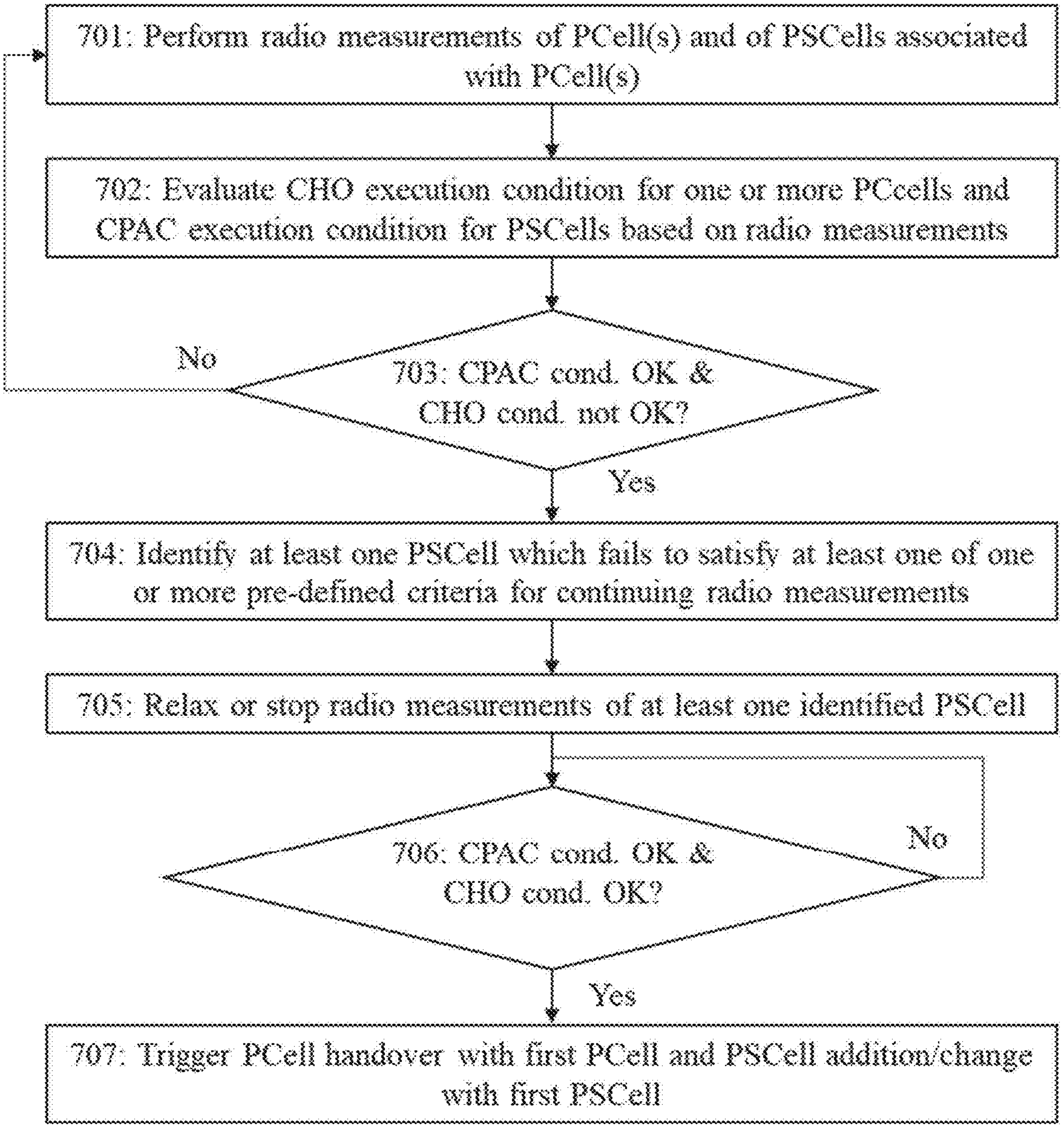

FIG. 7 illustrates another process according to embodiments for performing a CHO+CPAC handover. The illustrated processes of FIG. 7 may be performed by a terminal device or a part thereof. The terminal device may be one of the terminal devices 100, 102 of FIG. 1. In the following, the entity performing the process of FIG. 7 is called an apparatus for simplicity.

The process of FIG. 7 corresponds to a large extent to the process of FIG. 3. Namely, blocks 701 to 703, 706, 707 of FIG. 7 may correspond fully to blocks 301 to 303, 305, 306 of FIG. 3. In other words, FIG. 7 serves to further define the operation associated with block 304 of FIG. 3 (i.e., the relaxing/stopping of radio measurements of at least one PSCell). The following discussion of FIG. 7 is, consequently, predominantly limited to discussing actions pertaining to blocks 704, 705.

Referring to FIG. 7, in response to the CPAC execution condition for a first PSCell being satisfied while the CHO execution condition for any PCell associated with the first PSCell is not satisfied in block 703, the apparatus first identifies, in block 704, at least one PSCell which fails to satisfy at least one of one or more pre-defined criteria for continuing current radio measurements (i.e., for continuing radio measurements without changes, that is, for continuing non-relaxed radio measurements) and, then, relaxes or stops, in block 705, radio measurements of the at least one PSCell identified in block 704.

The one or more pre-defined criteria of block 705 may be defined in a variety of different ways. The one or more pre-defined criteria for continuing current radio measurements may, for example, define that a PSCell for which radio measurements may be allowed to continue must be a PSCell for which results of radio measurements are especially promising (e.g., exceed a predefined signal quality or strength threshold). To give another example, the one or more pre-defined criteria for continuing current radio measurements may define that radio measurements may be allowed to continue only for the first PSCell which satisfied the CPAC execution condition. In some cases, the one or more pre-defined criteria for continuing current radio measurements may define that no PSCell measurements should be continued at all. Different possible definitions for the one or more pre-defined criteria will be discussed in further detail below in connection with FIGS. 8 to 12.

The evaluation of the one or more pre-defined criteria in block 704 may be continued until both CPAC and CHO execution conditions are satisfied in block 706. Thus, in some embodiments, the apparatus may initially relax or stop radio measurements of at least one PSCell failing to satisfy at least one of the one or more pre-defined criteria and subsequently relax or stop one or more further PSCells failing satisfy at least one of the one or more pre-defined criteria at that later time instance.

FIGS. 8 to 12 illustrate different criteria (as discussed in connection with block 505 of FIG. 5) according to which radio measurements of PSCells are continued in their current form or stopped/relaxed. FIGS. 8 to 12 relate specifically to an exemplary case where radio measurements are performed initially for a single PCell (two PCells in FIG. 11) and eight different PSCells though the features discussed are, in no way, limited to these numbers of PCells and PSCells. FIGS. 8 to 12 shows which of these PSCell-specific radio measurements may be stopped/relaxed according to different criteria. Specifically, in FIGS. 8 to 12, the vertical bars show the radio measurements per prepared cells (for both PCell and PSCells) as a function of time from left to right. When a vertical bar terminates, this means that the apparatus (e.g., a terminal device) performs measurement stopping/relaxation for the associated PCell or PSCell. In each of FIGS. 8 to 12, it is assumed that initially radio measurements are being performed for all of the PCell (PCell-1 & PCell-2 in FIG. 11) and the PSCell-1 to PSCell-8.

Figure 8:
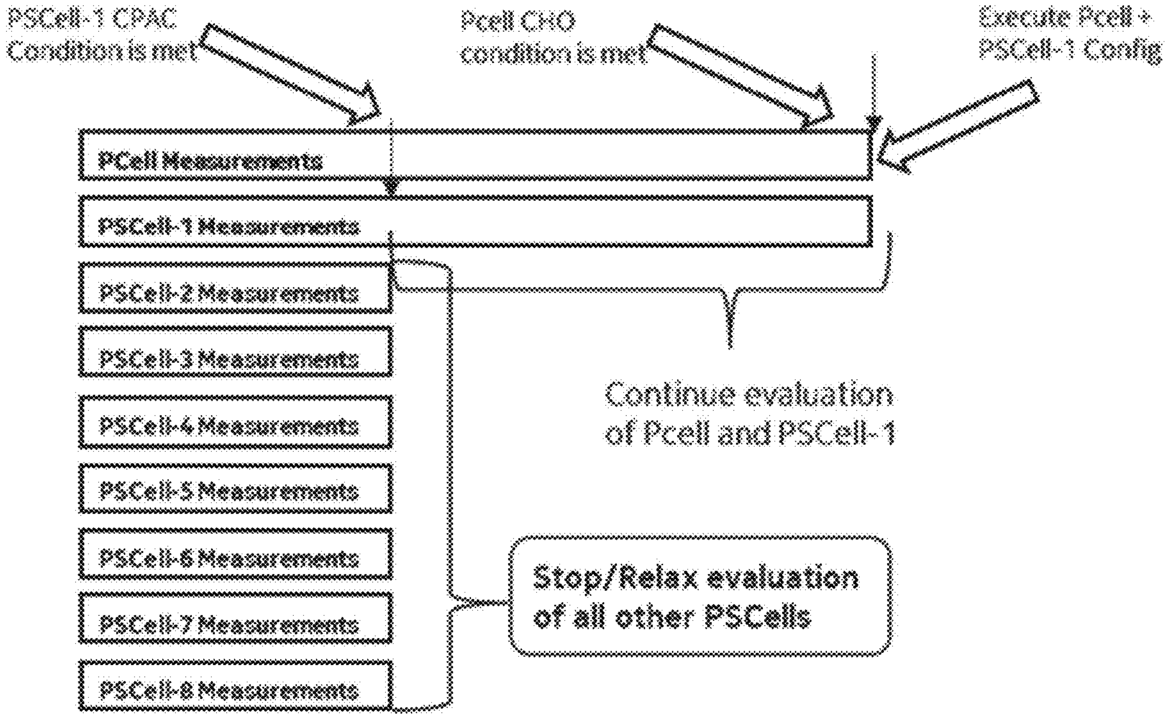

FIG. 8 illustrates an example of an embodiment where the one or more pre-defined criteria for continuing current radio measurements defines that radio measurements of the PSCells are allowed to continue unchanged only for the first PSCell which satisfied the CPAC execution condition (e.g., in block 603). Consequently, radio measurements for all PSCells other than the first PSCell (in this example, PSCell-2 to PSCell-8) are stopped or relaxed by the apparatus. The radio measurements for the PCell are also continued without changes.

Figure 9:
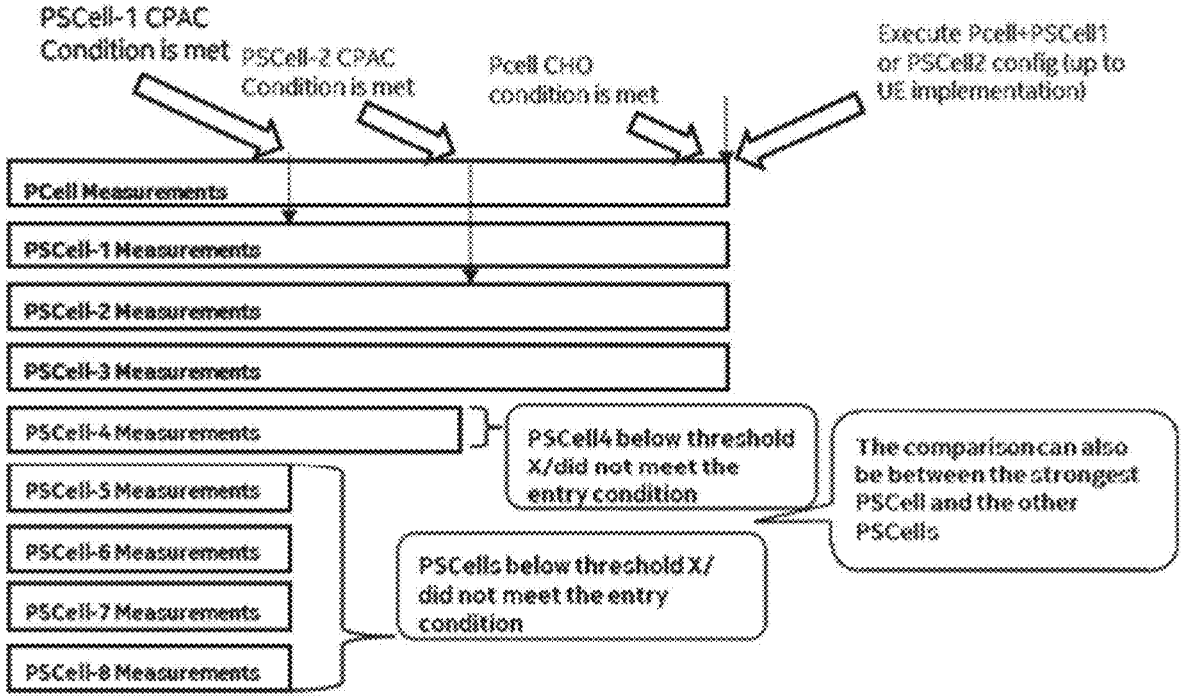

FIG. 9 illustrates an example of an embodiment where the one or more pre-defined criteria for continuing current radio measurements define that radio measurements of the PSCells are allowed to continue unchanged for a PSCell only if said PSCell fulfils the following: 1) the PSCell exceeds (or is equal to) a pre-defined threshold defining a minimum value for a metric for signal strength or signal quality of a PSCell (measured at the terminal device) and 2) the PSCell satisfies at least one pre-defined entry criterion of the CPAC execution condition. In other words, if either of the two conditions is not satisfied for a given PSCell, radio measurements for said PSCell are stopped or relaxed by the apparatus. The metric for signal strength or signal quality of a PSCell may be, e.g., RSRP or RSRQ. The at least one pre-defined entry criterion of the CPAC execution condition may be or comprise, e.g., a criterion that a time-to-trigger, TTT, timer of the CPAC execution condition has started running.

In some embodiments, the pre-defined threshold may be defined to be frequency-dependent. In other words, the one or more pre-defined criteria for continuing current radio measurements may comprise a plurality of pre-defined frequency-specific thresholds for a plurality of frequencies of the PSCells defining each a minimum value for a metric for signal strength or signal quality of a PSCell.

In the example of FIG. 9, the radio measurements for PSCell-5 to PSCell-8 are relaxed or stopped first following the PSCell-1 satisfying the CPAC execution condition. Namely, specifically the radio measurements for PSCell-5 to PSCell-8 are relaxed or stopped due to radio measurements for these PSCells being below a pre-defined threshold defining a minimum value for a metric for signal strength or signal quality of a PSCell and/or failing to meet the pre-defined entry criterion of the CPAC execution condition. Radio measurements of PSCell-1 to PSCell-4 are determined to be above (or equal to) the pre-defined threshold defining the minimum value for the metric for the signal strength or signal quality of a PSCell and satisfying the pre-defined entry criterion of the CPAC execution condition. Consequently, said PSCells are not relaxed or stopped. Subsequently, radio measurements of PSCell-4 are also relaxed or stopped due to radio measurements of said PSCell being, at that time, below the pre-defined threshold defining the minimum value for the metric for the signal strength or signal quality of a PSCell and/or failing to meet the pre-defined entry criterion of the CPAC execution condition. FIG. 9 also shows that the CPAC execution condition is satisfied later also for PSCell-2 (whose measurement were not relaxed or halted). In this example, the CHO+CPAC re-configuration may be carried out for the PCell and either of the PSCell-1 or PSCell-2.

As indicated in FIG. 9, in some embodiments, the pre-defined threshold may be defined to for a relative metric defining signal strength or signal quality of a PSCell relative to the PSCell having the highest signal strength or signal quality.

In some embodiments, only one of the two conditions applied in FIG. 9 may be included in the one or more pre-defined criteria.

Figure 10:
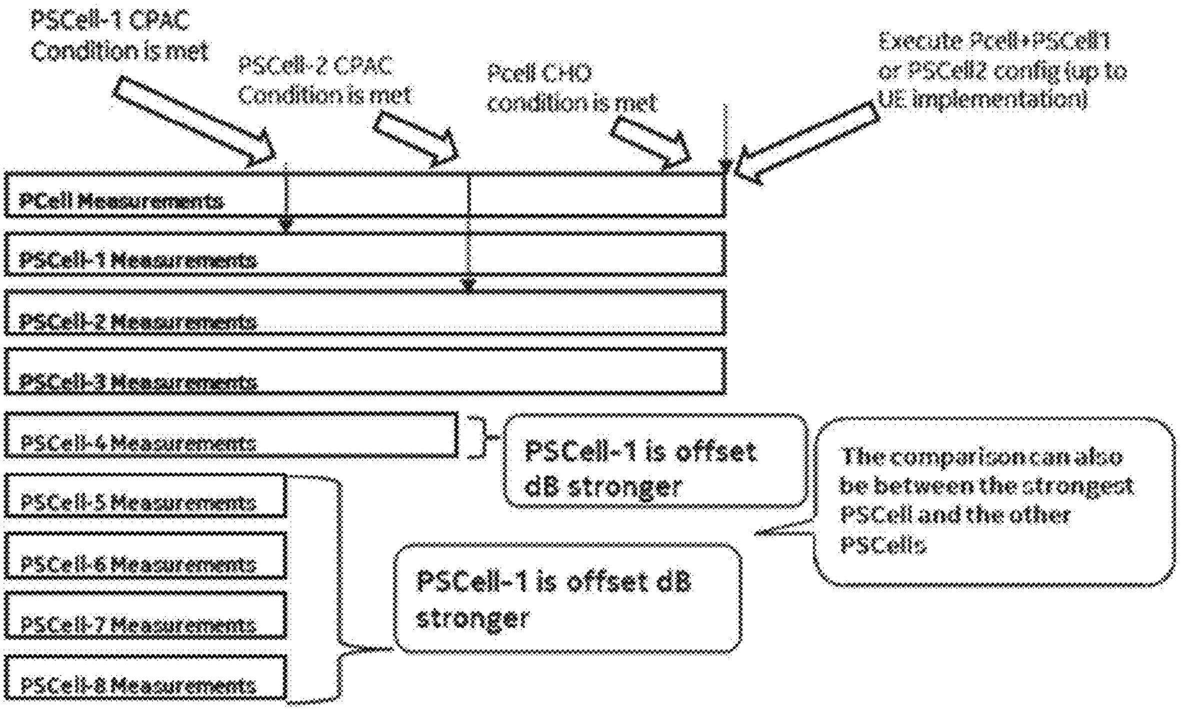

FIG. 10 illustrates an example of an embodiment where the one or more pre-defined criteria for continuing current radio measurements define that radio measurements of the PSCells are allowed to continue unchanged for a PSCell only if said PSCell exceeds a pre-defined relative threshold defining a minimum value for a (relative) metric quantifying signal strength or signal quality of the PSCell relative to signal strength or signal quality of the first PSCell. In other words, the apparatus may evaluate here if $$\frac{P_{PSCell}}{P_{PSCell-1}} > P_{relthr}$$

or equally $P_{PSCell}$ [dB]—$P_{PsCell-1}$ [dB]>$P_{relthr}$ [dB] holds for a given PSCell. Here, $P_{PSCell}$ is the signal strength or quality (e.g., RSRP or RSRQ) for the PSCell under evaluation, $P_{PSCell-1}$ is the signal strength or quality (e.g., RSRP or RSRQ) for the first PSCell (i.e., PSCell-1) and $P_{relthr}$ is the minimum value defined by the pre-defined relative threshold. The expression "[dB]" indicates that the values are given in decibels (or in dBm). Hence, the apparatus may relax or stop the radio measurements for the PSCells which are unlikely to provide a stronger/higher quality radio connection compared to the first PSCell.

In some embodiments, the pre-defined relative threshold may be frequency-dependent. In other words, the one or more pre-defined criteria for continuing current radio measurements may comprise a plurality of pre-defined frequency-specific relative thresholds for a plurality of frequencies of the PSCells. Here, each of the plurality of pre-defined frequency-specific relative thresholds may define a frequency-specific minimum value for a relative metric quantifying signal strength or signal quality (e.g., RSRP or RSRQ) of a PSCell at a given frequency relative to signal strength or signal quality of the first PSCell (at its operating frequency).

In the example of FIG. 10, the radio measurements for PSCell-5 to PSCell-8 are relaxed or stopped first following the PSCell-1 satisfying the CPAC execution condition as the RSRP or RSRQ for PSCell-1 is at least x dB larger than the RSRP or RSRQ for PSCell-5 to PSCell-8 (x being a pre-defined positive real number). Subsequently, radio measurements of PSCell-4 are also relaxed or stopped due to the RSRP or RSRQ for PSCell-1 being, at that time, at least x dB larger than the RSRP or RSRQ for PSCell-4. FIG. 10 also shows that the CPAC execution condition is satisfied, at a later time instance, also for PSCell-2 (whose measurement were not relaxed or halted). In this example, the CHO+CPAC re-configuration may be carried out for the PCell and either of the PSCell-1 or PSCell-2.

Figure 11:
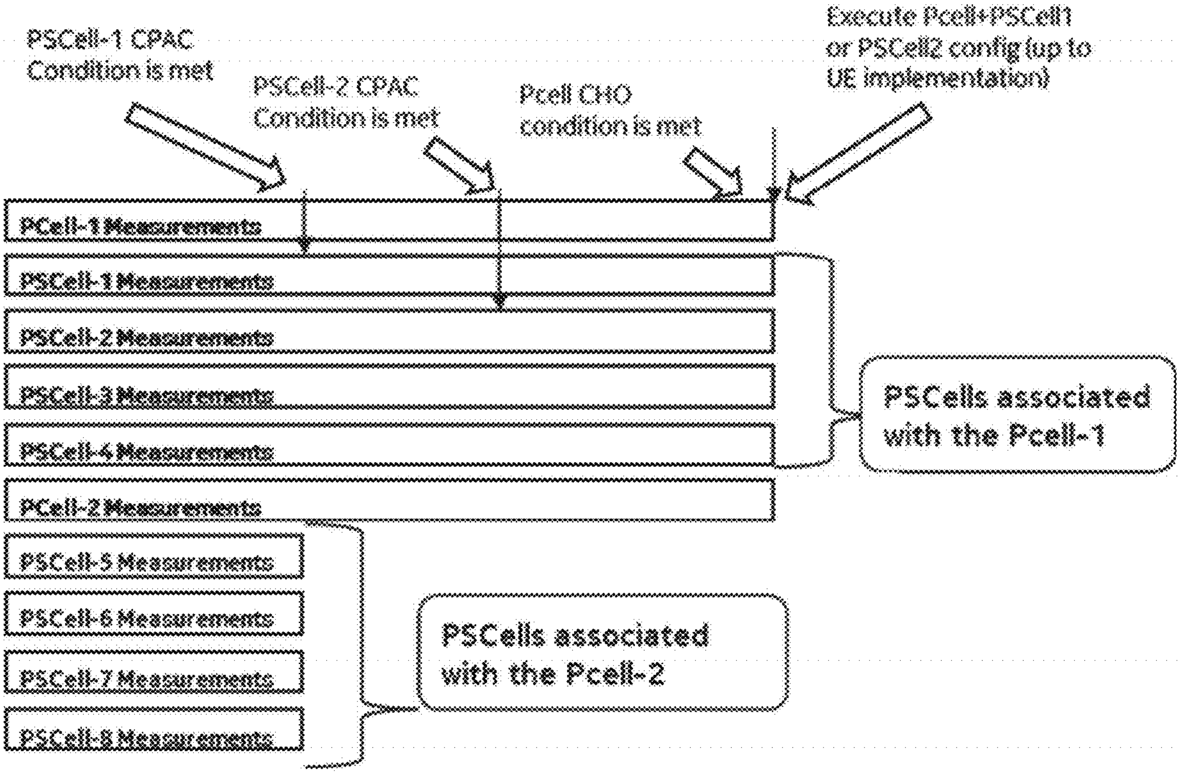

FIG. 11 illustrates an example of an embodiment where the one or more pre-defined criteria for continuing current radio measurements define that radio measurements are allowed to continue unchanged for a PSCell only if the PSCell is associated with the first PCell (i.e., PCell-1), where the first PCell is assumed to be a PCell associated with the first PSCell satisfying the CPAC execution condition. In other words, any PSCells which are not associated with the same PCell as the first PSCell are to be relaxed or stopped. Obviously, this alternative has any effect only if the radio measurements are being performed for a plurality of PCells each of which is associated with different PSCells.

In the example of FIG. 11, PCell-1 is associated with PSCell-1 to PSCell-4 while PCell-2 is associated with PSCell-5 to PSCell-8. In the example of FIG. 11, the radio measurements for PSCell-5 to PSCell-8 associated with PCell-2 are relaxed or stopped following the PSCell-1 satisfying the CPAC execution condition. Later on, the CPAC execution condition is also satisfied for the PSCell-2 though this does not lead to any further relaxation or stopping of radio measurements as both PSCell-1 and PSCell-2 are associated with the same PCell.

Figure 12:
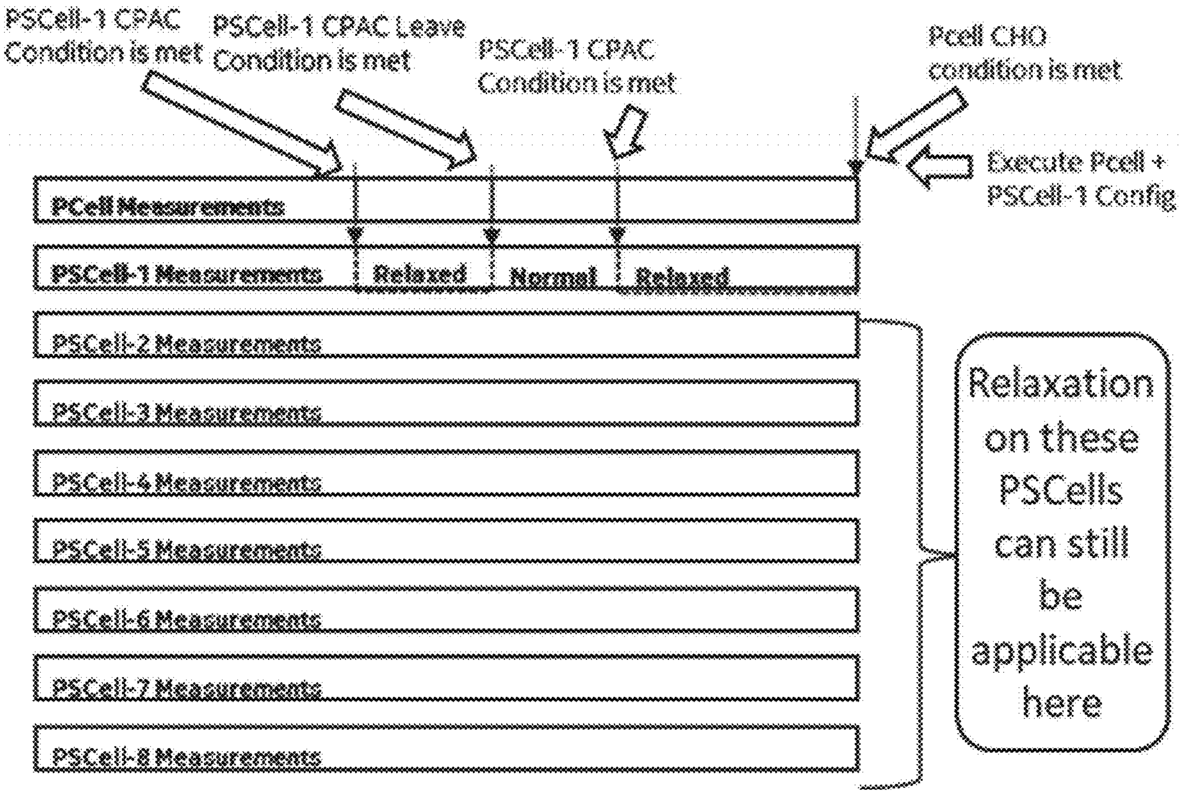

FIG. 12 illustrates an example of an embodiment where the one or more pre-defined criteria for continuing current radio measurements define that radio measurements of the first PSCell (i.e., PSCell-1) for which the CPAC execution condition is satisfied are to be relaxed or stopped. Specifically, FIG. 12 shows an example where the radio measurement for PSCell-1 are relaxed once the CPAC execution condition is satisfied for PCell-1. Subsequently, the apparatus (e.g., the terminal device) may monitor whether or not CPAC leave condition is satisfied for PSCell-1. In response to the CPAC leave condition being satisfied, the apparatus continues the performing of the radio measurements for the PSCell-1, as is shown in FIG. 12. The apparatus may again relax or stop radio measurements for the PSCell-1 if the CPAC execution condition is again satisfied, as shown in FIG. 12.

While FIGS. 8 to 12 discussed only the relaxation/stopping of radio measurements for at least one PSCell, any of the other stopping/relaxation functionalities discussed in connection with FIGS. 3, 4A, 5A and/or 6A may be combined also with these embodiments. Also, the relaxation/stopping according FIGS. 8 to 12 may be applied at any frequency or only at frequencies other than the (operating) frequencies of the first PSCell satisfying the CPAC execution condition.

In some embodiments, the apparatus may stop evaluation of the CHO and/or CPAC execution conditions to save processing power of the terminal device. This may be an independent procedure which may be combined with any of the measurement/stopping relaxation processes discussed in connection with above embodiments.

Figure 13:
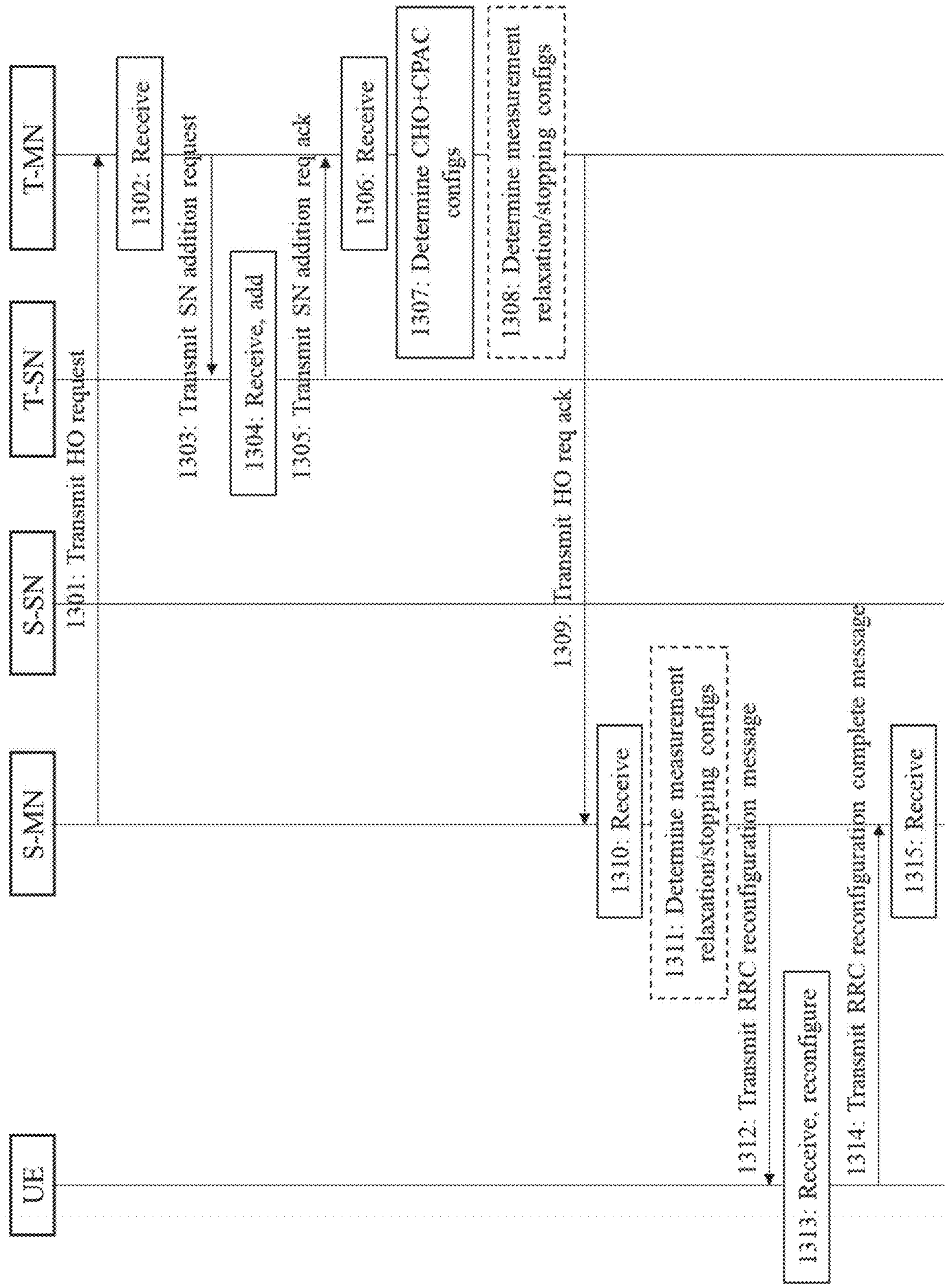
FIG. 13 illustrates signalling according to embodiments.

FIG. 13 illustrates signalling between a source MN (S-MN), a source SN (S-SN), a target SN (T-SN), a target MN (T-SN) and a terminal device (UE) for configuring the UE for performing CHO+CPAC reconfiguration of the terminal device as well as measurement relaxation/stopping according to embodiments. The features 1308, 1311 indicated in FIG. 13 using dashed lines may be considered optional. Namely, one or both of blocks 1308, 1311 may be included in the procedure.

Referring to FIG. 13, the S-MN initially transmits, in message 1301, a handover request for requesting handover of the UE to the T-MN. The T-MN receives, in block 1302, the handover request.

The T-MN transmits, in message 1303, an SN addition request to the T-SN (based on the handover request). The SN addition request may request addition of one or more PSCells (e.g., PSCell-1 to PSCell-8) to SCG of the T-SN. The T-SN receives, in block 1304, the SN addition request. The T-SN adds, in block 1304, the requested PSCell(s) to its SCG. Subsequently, the T-SN transmits, in message 1305, an SN addition request acknowledgement back to the T-MN. The SN addition request acknowledgment serves to acknowledge that the addition was carried out successfully. The T-MN receives, in block 1306, the SN addition request acknowledgment.

In some embodiments, elements 1303 to 1306 may be omitted.

The T-MN determines, in block 1308, one or more CHO+CPAC configurations for the terminal device. Each (or at least some) of the one or more CHO+CPAC configurations may comprise an MCG configuration for a PCell and an SCG configuration for a PSCell associated with said PCell. The one or more CHO+CPAC configurations may altogether relate to one or more PCells associated each with one or more PSCells. To give an example (corresponding to scenario of FIGS. 4B and/or 6B), the one or more CHO+CPAC configurations may comprise the following configurations:

PCell-1 MCG+PSCell-1 SCG configuration,
PCell-1 MCG+PSCell-2 SCG configuration,
PCell-1 MCG+PSCell-3 SCG configuration,
PCell-1 MCG+PSCell-4 SCG configuration,
PCell-2 MCG+PSCell-5 SCG configuration,
PCell-2 MCG+PSCell-6 SCG configuration,
PCell-2 MCG+PSCell-7 SCG configuration and
PCell-2 MCG+PSCell-8 SCG configuration.

At least in some embodiments, the T-MN determines, in block 1308, one or more measurement relaxation/stopping configurations for the UE. In other embodiments, the T-MN may determine the one or more measurement relaxation/stopping configurations for the UE only partly or not at all. The determination in block 1308 may be based on a UE type of the UE. Examples of UE types may comprise, a UE with reduced capability and/or a UE with low battery situation. Additionally or alternatively, the determination in block 1308 may be based on one or more previous mobility events, i.e., on mobility history between the source cell and the target cell. Namely, the source cell may be able to observe whether or not the UE relaxation/stopping causes any mobility problems. These observations may be used for the determining in block 1308. In some embodiments, the determination may be based, additionally or alternatively, on one or more CHO+CPAC configurations defined for the UE.

Each (or at least some) of the one or more measurement relaxation/stopping configurations may define a (different) measurement relaxation/stopping scheme according to any of the embodiments discussed above. Each (or at least some) of the one or more measurement relaxation/stopping configurations may be define that in response to the CPAC execution condition for a first PSCell being satisfied (and optionally one or more further conditions being satisfied as discussed in connection with blocks 504 to 505 of FIG. 5 or blocks 604 to 605 of FIG. 5) while the CHO execution condition for any PCell associated with the first PSCell is not satisfied, the UE should either relax or stop radio measurements of at least one PSCell and/or at least one PCell. Each (or at least some) of the one or more measurement relaxation/stopping configurations may define one or more predefined rules for the relaxing/stopping of the at least one PSCell and/or at least one PCell. The one or more predefined rules may define, e.g., which of relaxing or stopping should be performed, does the relaxing or stopping concern at least one PSCell and/or at least one PCell, how should said at least one PSCell and/or PCell be selected, should the relaxing/stopping be applied at all or only some frequencies and so on. In some embodiments, the one or more predefined rules may also define conditions for triggering the relaxing/stopping (e.g., as discussed in connection with block 303 of FIG. 3, block 403 of FIG. 4, any of blocks 503 to 505 of FIG. 4, any of blocks 603 to 605, block 703 of FIG. 3). To give an example, the one or more measurement relaxation/stopping configurations may comprise one, two or three of the following three measurement/relaxation configuration:

- Measurement relaxation/stopping configuration 1: Measurement relaxation of all PSCell measurements except for PSCell measurements of PScell satisfying the CPAC execution condition,
- Measurement relaxation/stopping configuration 2: Measurement relaxation of measurements of PSCell satisfying the CPAC execution condition only, and
- Measurement relaxation/stopping configuration—3: Measurement relaxation of measurements of any PCells other than the PCell associated with the PSCell satisfying the CPAC execution condition.

The T-MN transmits, in message 1309, a handover request acknowledgment back to the S-MN. The handover request acknowledgment may comprise the one or more CHO+CPAC configurations determined in block 1307. The handover request acknowledgment may further comprise the one or more measurement relaxation/stopping configurations if they were determined in block 1308.

The S-MN receives, in block 1310, the handover request acknowledgement.

At least in embodiments where the one or more measurement relaxation/stopping configurations were not determined in block 1308 or were determined only partly in block 1308, the S-MN determines, in block 1311, one or more measurement relaxation/stopping configurations for the UE. This determination may be based on one or more CHO+CPAC configurations of the UE received in block 1310. The one or more measurement relaxation/stopping configurations may be defined as described in connection with block 1308.

In some embodiments, the T-MN may determine one or more first measurement relaxation/stopping configurations for the UE in block 1308 while the S-MN determines one or more second measurement relaxation/stopping configurations for the UE in block 1311. One example of such an embodiment could be as follows: the T-MN determines the PSCell-associated measurement relaxation/stopping configuration(s) (CPAC), whereas the S-MN determines the PCell-associated measurement relaxation/stopping configuration(s) (CHO). This division would be sensible as the T-MN prepares the PSCells while the S-MN prepares the PCells.

The S-MN transmits, in message 1312, a reconfiguration message to the UE. The reconfiguration message may be an RRC reconfiguration message. The reconfiguration message may define both an SN (RRC) reconfiguration and an MN (RRC) reconfiguration for the UE. The reconfiguration message comprises the one or more CHO+CPAC configurations determined in block 1307 and the one or more relaxation/stopping configurations determined in block 1308 and/or block 1311.

The UE receives, in block 1313, the reconfiguration message and reconfigures, in block 1313, itself according to the reconfiguration message.

The UE transmits, in message 1314, a reconfiguration complete message back to the S-MN. The S-MN receives, in block 1315, the reconfiguration message. In some embodiments, elements 1314, 1315 may be omitted.

Following the completion of the re-configuration procedure of FIG. 13, the UE may carry out the CHO+CPAC handover process with measurement relaxation/stopping functionality according to any of the embodiments discussed above (e.g., as shown in any of FIGS. 3, 4A, 4B, 5A, 5B, 6A, 6B, 7 to 13) based on the one or more CHO+CPAC configurations and one or more measurement relaxation/stopping configurations.

In some embodiments, the one or more CHO+CPAC configurations and the one or more measurement relaxation/stopping configurations may be transmitted in separate messages. In one embodiment, the T-MN determines the measurement relaxation configurations of the UE and sends the configurations to S-MN. Hence, the S-MN forwards the configuration to the UE.

The blocks, related functions, and information exchanges described above by means of FIGS. 3, 4A, 4B, 5A, 5B, 6A, 6B, 7 to 13 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 14:
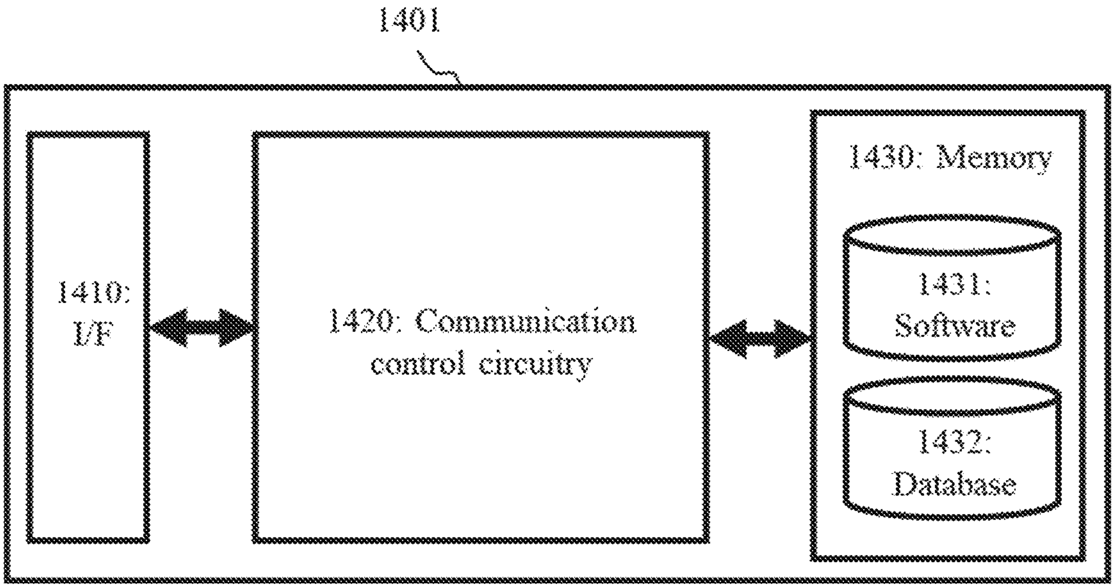
FIG. 14 illustrates an apparatus according to some embodiments.

FIG. 14 provides an apparatus 1401 according to some embodiments. Specifically, FIG. 14 may illustrate a terminal device or a part thereof. Alternatively, FIG. 14 may illustrate an SN or a part thereof or an MN or a part thereof.

The apparatus 1401 may comprise one or more communication control circuitry 1420, such as at least one processor, and at least one memory 1430, including one or more algorithms 1431 (instructions), such as a computer program code (software) wherein the at least one memory and the computer program code (software) are configured, with the at least one processor, to cause the apparatus 1401 to carry out any one of the exemplified functionalities of the apparatus (being, e.g., a terminal device, an SN or an MN) described above. Said at least one memory 1430 may also comprise at least one database 1432.

When the one or more communication control circuitry 1420 comprises more than one processor, the apparatus 1401 may be a distributed device wherein processing of tasks takes place in more than one physical unit. Each of the at least one processor may comprise one or more processor cores. A processing core may comprise, for example, a Cortex-A8 processing core manufactured by ARM Holdings or a Zen processing core designed by Advanced Micro Devices Corporation. The one or more communication control circuitry 1420 may comprise at least one Qualcomm Snapdragon and/or Intel Atom processor. The one or more communication control circuitry 1420 may comprise at least one application-specific integrated circuit (ASIC). The one or more control circuitry 1420 may comprise at least one field-programmable gate array (FPGA).

Referring to FIG. 14, the one or more communication control circuitry 1420 of the apparatus 1401 are configured to carry out functionalities described above by means of any of FIGS. 3, 4A, 4B, 5A, 5B, 6A, 6B, 7 to 12 and/or at least some of elements of FIG. 13 using one or more individual circuitries. It is also feasible to use specific integrated circuits, such as ASIC (Application Specific Integrated Circuit) or other components and devices for implementing the functionalities in accordance with different embodiments.

Referring to FIG. 14, the apparatus 1401 may further comprise different interfaces 1410 such as one or more communication interfaces comprising hardware and/or software for realizing communication connectivity according to one or more communication protocols. Specifically when the apparatus 1401 is a terminal device or a part thereof, the one or more communication interfaces 1410 may comprise, for example, communication interfaces providing a connection between the apparatus 1401 and one or more access nodes for providing connection to core network, where the one or more access nodes may comprise one or more SNs and/or one or more MNs. Specifically when the apparatus 1401 is a master/secondary node or a part thereof, the one or more communication interfaces 1410 may comprise, for example, communication interfaces providing a connection between the apparatus 1401 and one or more terminal devices and a connection between the apparatus 1401 and one or more core network nodes.

The one or more communication interfaces 1410 may comprise standard well-known components such as an amplifier, filter, frequency-converter, (de)modulator, and encoder/decoder circuitries, controlled by the corresponding controlling units, and one or more antennas. The apparatus 1401 may also comprise one or more user interfaces.

Referring to FIG. 14, the memory 1430 may be implemented using any suitable data storage technology, such as semiconductor based memory devices, flash memory, magnetic memory devices and systems, optical memory devices and systems, fixed memory and removable memory.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with soft-ware/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hard-ware circuit or processor (or multiple processors) or a portion of a hardware circuit or processor and its (or their) accompanying software and/or firmware.

In an embodiment, at least some of the processes described in connection with FIGS. 3, 4A, 4B, 5A, 5B, 6A, 6B, 7 to 13 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, filter (low-pass, high-pass, bandpass and/or bandstop), sensor, circuitry, inverter, capacitor, inductor, resistor, operational amplifier, diode and transistor. In an embodiment, the at least one processor, the memory, and the computer program code form processing means or comprises one or more computer program code portions for carrying out one or more operations according to any one of the embodiments of FIGS. 3, 4A, 4B, 5A, 5B, 6A, 6B, 7 to 13 or operations thereof. In some embodiments, at least some of the processes may be implemented using discrete components.

According to an embodiment, there is provided an apparatus (e.g., a terminal device or a part thereof) comprising means for performing:

performing radio measurements of one or PCells and of PSCells associated with the one or more PCells;

evaluating CHO execution condition of the one or more PCells and CPAC execution condition of the PSCells based on the radio measurements;

at least in response to the CPAC execution condition for a first PSCell being satisfied while the CHO execution condition for any PCell associated with the first PSCell is not satisfied, relaxing or stopping radio measurements of at least one PSCell.

According to an embodiment, there is provided an apparatus (e.g., a terminal device or a part thereof) comprising at least one processor; and at least one memory storing instructions that, when executed by the at least one processor, cause the apparatus at least to perform:

performing radio measurements of PCells and of PSCells associated with the PCells;

evaluating CHO execution condition of the PCells and CPAC execution condition of the PSCells based on the radio measurements;

at least in response to the CPAC execution condition for a first PSCell being satisfied while the CHO execution condition for any PCell associated with the first PSCell is not satisfied, relaxing or stopping radio measurements of at least one PCell. Optionally, the at least PCell may be or comprise at least one PCell not associated with the first PSCell.

According to an embodiment, there is provided an apparatus (e.g., a terminal device or a part thereof) comprising means for performing:

performing radio measurements of PCells and of PSCells associated with the PCells;

evaluating CHO execution condition of the PCells and CPAC execution condition of the PSCells based on the radio measurements;

at least in response to the CPAC execution condition for a first PSCell being satisfied while the CHO execution condition for any PCell associated with the first PSCell is not satisfied, relaxing or stopping radio measurements of at least one PCell. Optionally, the at least PCell may be or comprise at least one PCell not associated with the first PSCell.

According to an embodiment, there is provided an apparatus (e.g., a network node such as an MN) comprising at least one processor; and at least one memory storing instructions that, when executed by the at least one processor, cause the apparatus at least to perform:

determining one or more measurement relaxation/stopping configurations for a terminal device, wherein each of the one or more measurement relaxation/stopping configurations defining one or more pre-defined rules for stopping or relaxing radio measurements of at least one PSCell and/or at least one PCell; and transmitting a message (e.g., a handover request acknowledgment or a reconfiguration message) to the terminal device or to a master node associated with the terminal device, wherein the message comprises the one or more measurement relaxation/stopping configurations for the terminal device.

According to an embodiment, there is provided an apparatus (e.g., a network node such as an MN) comprising means for performing:

determining one or more measurement relaxation/stopping configurations for a terminal device, wherein each of the one or more measurement relaxation/stopping configurations defining one or more pre-defined rules for stopping or relaxing radio measurements of at least one PSCell and/or at least one PCell; and transmitting a message (e.g., a handover request acknowledgment or a reconfiguration message) to the terminal device directly or to a master node associated with the terminal device, wherein the message comprises the one or more measurement relaxation/stopping configurations for the terminal device.

Embodiments as described may also be carried out, fully or at least in part, in the form of a computer process defined by a computer program or portions thereof. Embodiments of the methods described in connection with FIGS. 3, 4A, 4B, 5A, 5B, 6A, 6B, 7 to 13 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

The term "non-transitory", as used herein, is a limitation of the medium itself (that is, tangible, not a signal) as opposed to a limitation on data storage persistency (for example, RAM vs. ROM).

Reference throughout this specification to one embodiment or an embodiment means that a particular feature, structure, or characteristic described in connection with the embodiment is included in at least one embodiment of the present solution. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present solution may be referred to herein along with alternatives for the various components thereof. It is understood that such embodiments, examples, and alternatives are not to be construed as de facto equivalents of one another, but are to be considered as separate and autonomous representations of the present solution.

Even though embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

INDUSTRIAL APPLICABILITY

At least some embodiments find industrial application in wireless communications.

The invention claimed is:

1. An apparatus comprising:

at least one processor; and at least one memory storing instructions that, when executed by the at least one processor, cause the apparatus at least to perform:

performing radio measurements of primary cells (PCells) and of primary secondary cells (PSCells) associated with the PCells;

evaluating a first conditional handover (CHO) execution condition of the PCells and a first conditional PSCell addition and change (CPAC) execution condition of the PSCells based on the radio measurements;

at least in response to the first CPAC execution condition for a first PSCell being satisfied while the CHO execution condition for a first PCell associated with the first PSCell is not satisfied:

determining that a pre-defined criteria for continuing current radio measurements for a second PSCell are not satisfied:

stopping radio measurements of the second PSCell at a frequency not used by the first PSCell while continuing radio measurements of the second PSCell at frequencies used by the first PSCell; and stopping evaluating of the CHO execution condition for all PCells other than the first PCell, wherein the pre-defined criteria for continuing current radio measurements comprise the following: a first plurality of pre-defined frequency-specific thresholds for a first plurality of frequencies of the PSCells, each of the first plurality of pre-defined frequency-specific relative thresholds defining a minimum value for a metric for signal strength or signal quality of a PSCell, and a second plurality of pre-defined frequency-specific relative thresholds for a second plurality of frequencies of the PSCells, each of the second plurality of pre-defined frequency-specific relative thresholds defining a frequency-specific minimum value for a relative metric quantifying signal strength or signal quality of a PSCell at a given frequency relative to signal strength or signal quality of the first PSCell;

evaluating a second CHO execution condition of the PCells and a second conditional PSCell CPAC execution condition of the PSCells based on the radio measurements; and in response to the second CPAC execution condition for the first PSCell and the second CHO execution condition for the first PCell associated with the first PSCell being satisfied, triggering a PCell handover with the first PCell and a PSCell change with the second PSCell.

2. The apparatus of claim 1, wherein the second PSCell for which radio measurements are stopped further comprises all of the PSCells other than the first PSCell.

3. The apparatus of claim 2, where the at least one memory and the instructions are configured, with the at least one processor, to cause the apparatus to perform, following the stopping of the radio measurements for the first PSCell:

in response to a CPAC leave condition being satisfied for the first PSCell, continuing the radio measurements for the first PSCell.

4. The apparatus of claim 3, wherein the pre-defined criteria for continuing current radio measurements comprise:

a pre-defined threshold defining a minimum value for a metric for signal strength or signal quality of a PSCell.

5. The apparatus of claim 4, wherein the pre-defined criteria for continuing current radio measurements comprise:

a pre-defined relative threshold defining a minimum value for a relative metric quantifying signal strength or signal quality of a PSCell relative to signal strength or signal quality of the first PSCell.

6. The apparatus of claim 5, wherein the pre-defined criteria for continuing current radio measurements comprise:

at least one pre-defined entry criterion of the CPAC execution condition.

7. The apparatus of claim 6, wherein the at least one pre-defined entry criterion of the CPAC execution condition comprises a criterion that a time-to-trigger timer of the CPAC execution condition has started running.

8. The apparatus of claim 7, wherein the at least one memory and the instructions are configured, with the at least one processor, to cause the apparatus to perform, in response to the CPAC execution condition for the first PSCell being satisfied while the CHO execution condition the first PCell associated with the first PSCell is not satisfied:

stopping the evaluating of the CPAC execution condition for the PSCells.

9. A system comprising:

an apparatus:

at least one processor; and at least one memory storing instructions that, when executed by the at least one processor, cause the apparatus at least to perform:

performing radio measurements of primary cells (PCells) and of primary secondary cells (PSCells) associated with the PCells;

evaluating a first conditional handover (CHO) execution condition of the PCells and a first conditional PSCell addition and change (CPAC) execution condition of the PSCells based on the radio measurements;

at least in response to the first CPAC execution condition for a first PSCell being satisfied while the CHO execution condition for a first PCell associated with the first PSCell is not satisfied:

determining that a pre-defined criteria for continuing current radio measurements for a second PSCell are not satisfied:

stopping radio measurements of the second PSCell at a frequency not used by the first PSCell while continuing radio measurements of the second PSCell at frequencies used by the first PSCell; and stopping evaluating of the CHO execution condition for all PCells other than the first PCell, wherein the pre-defined criteria for continuing current radio measurements comprise the following: a first plurality of pre-defined frequency-specific thresholds for a first plurality of frequencies of the PSCells, each of the first plurality of pre-defined frequency-specific relative thresholds defining a minimum value for a metric for signal strength or signal quality of a PSCell, and a second plurality of pre-defined frequency-specific relative thresholds for a second plurality of frequencies of the PSCells, each of the second plurality of pre-defined frequency-specific relative thresholds defining a frequency-specific minimum value for a relative metric quantifying signal strength or signal quality of a PSCell at a given frequency relative to signal strength or signal quality of the first PSCell;

evaluating a second CHO execution condition of the PCells and a second conditional PSCell CPAC execution condition of the PSCells based on the radio measurements; and in response to the second CPAC execution condition for the first PSCell and the second CHO execution condition for the first PCell associated with the first PSCell being satisfied, triggering a PCell handover with the first PCell and a PSCell change with the second PSCell.

10. The system of claim 9, wherein the second PSCell for which radio measurements are stopped further comprises all of the PSCells other than the first PSCell.

11. The system of claim 10, where the at least one memory and the instructions are configured, with the at least one processor, to cause the apparatus to perform, following the stopping of the radio measurements for the first PSCell:

in response to a CPAC leave condition being satisfied for the first PSCell, continuing the radio measurements for the first PSCell.

12. The system of claim 11, wherein the pre-defined criteria for continuing current radio measurements comprise:

a pre-defined threshold defining a minimum value for a metric for signal strength or signal quality of a PSCell.

13. The system of claim 12, wherein the pre-defined criteria for continuing current radio measurements comprise:

a pre-defined relative threshold defining a minimum value for a relative metric quantifying signal strength or signal quality of a PSCell relative to signal strength or signal quality of the first PSCell.

14. The system of claim 13, wherein the pre-defined criteria for continuing current radio measurements comprise:

at least one pre-defined entry criterion of the CPAC execution condition.

15. The system of claim 14, wherein the at least one pre-defined entry criterion of the CPAC execution condition comprises a criterion that a time-to-trigger timer of the CPAC execution condition has started running.

16. The system of claim 15, wherein the at least one memory and the instructions are configured, with the at least one processor, to cause the apparatus to perform, in response to the CPAC execution condition for the first PSCell being satisfied while the CHO execution condition the first PCell associated with the first PSCell is not satisfied:

stopping the evaluating of the CPAC execution condition for the PSCells.

17. A method comprising:

performing radio measurements of primary cells (PCells) and of primary secondary cells (PSCells) associated with the PCells;

evaluating a first conditional handover (CHO) execution condition of the PCells and a first conditional PSCell addition and change (CPAC) execution condition of the PSCells based on the radio measurements;

at least in response to the first CPAC execution condition for a first PSCell being satisfied while the CHO execution condition for a first PCell associated with the first PSCell is not satisfied:

determining that a pre-defined criteria for continuing current radio measurements for a second PSCell are not satisfied:

stopping radio measurements of the second PSCell at a frequency not used by the first PSCell while continuing radio measurements of the second PSCell at frequencies used by the first PSCell; and stopping evaluating of the CHO execution condition for all PCells other than the first PCell, wherein the pre-defined criteria for continuing current radio measurements comprise the following: a first plurality of pre-defined frequency-specific thresholds for a first plurality of frequencies of the PSCells, each of the first plurality of pre-defined frequency-specific relative thresholds defining a minimum value for a metric for signal strength or signal quality of a PSCell, and a second plurality of pre-defined frequency-specific relative thresholds for a second plurality of frequencies of the PSCells, each of the second plurality of pre-defined frequency-specific relative thresholds defining a frequency-specific minimum value for a relative metric quantifying signal strength or signal quality of a PSCell at a given frequency relative to signal strength or signal quality of the first PSCell;

evaluating a second CHO execution condition of the PCells and a second conditional PSCell CPAC execution condition of the PSCells based on the radio measurements; and in response to the second CPAC execution condition for the first PSCell and the second CHO execution condition for the first PCell associated with the first PSCell being satisfied, triggering a PCell handover with the first PCell and a PSCell change with the second PSCell.

18. The method of claim 17, wherein the second PSCell for which radio measurements are stopped further comprises all of the PSCells other than the first PSCell.

19. The method of claim 18, further comprising:

in response to a CPAC leave condition being satisfied for the first PSCell, continuing the radio measurements for the first PSCell.

20. The method of claim 19, wherein the pre-defined criteria for continuing current radio measurements comprise:

a pre-defined threshold defining a minimum value for a metric for signal strength or signal quality of a PSCell;

a pre-defined relative threshold defining a minimum value for a relative metric quantifying signal strength or signal quality of a PSCell relative to signal strength or signal quality of the first PSCell; and at least one pre-defined entry criterion of the CPAC execution condition.

* * * * *